(12) United States Patent
Chauncey et al.

(10) Patent No.: US 7,987,363 B2
(45) Date of Patent: Jul. 26, 2011

(54) SECURE WIRELESS COMMUNICATIONS SYSTEM AND RELATED METHOD

(75) Inventors: David Chauncey, Fairport, NY (US); Mitel Kuliner, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 884 days.

(21) Appl. No.: 11/962,318

(22) Filed: Dec. 21, 2007

(65) Prior Publication Data
US 2010/0031036 A1    Feb. 4, 2010

(51) Int. Cl.
*H04L 9/32* (2006.01)

(52) U.S. Cl. .......... 713/168; 726/23; 380/270; 380/274; 709/208; 709/223

(58) Field of Classification Search .................. 713/168; 380/270, 274; 455/411; 709/208, 223; 726/23
See application file for complete search history.

(56) References Cited

U.S. PATENT DOCUMENTS

| | | | |
|---|---|---|---|
| 6,377,589 B1* | 4/2002 | Knight et al. ................. | 370/524 |
| 6,959,090 B1* | 10/2005 | Alve et al. ..................... | 380/277 |
| 7,096,200 B2 | 8/2006 | Wang et al. ..................... | 705/50 |
| 7,369,496 B1* | 5/2008 | Wiggins et al. ............... | 370/235 |
| 7,562,390 B1* | 7/2009 | Kwan ............................. | 726/23 |
| 7,730,519 B2* | 6/2010 | Aaron et al. ..................... | 726/2 |
| 7,869,597 B2* | 1/2011 | Nakai et al. ..................... | 380/255 |
| 2002/0144156 A1* | 10/2002 | Copeland, III ................ | 713/201 |
| 2003/0233573 A1* | 12/2003 | Phinney ........................ | 713/200 |
| 2005/0135306 A1 | 6/2005 | McAllen et al. .............. | 370/329 |
| 2006/0067313 A1* | 3/2006 | Bleisteiner et al. ........... | 370/389 |
| 2006/0129807 A1 | 6/2006 | Halasz et al. ................. | 713/163 |
| 2006/0153244 A1* | 7/2006 | Jao ................................ | 370/503 |
| 2006/0195402 A1 | 8/2006 | Malina et al. .................. | 705/76 |
| 2009/0074009 A1* | 3/2009 | Kuliner ......................... | 370/474 |

FOREIGN PATENT DOCUMENTS

FR    2844936    3/2004

OTHER PUBLICATIONS

Vaidehi Kasarekar, Distributed Hybrid Agent Based Intrusion Detection and Real-Time Response System for Wireless LANs, pp. 1-62, 2003.*
"RF-7800W Broadband Ethernet Radio", Harris Corporation, RF Communications Division, 2 pages, 2007, available at www.harris.com.

* cited by examiner

*Primary Examiner* — Nasser Moazzami
*Assistant Examiner* — Shanto M Abedin
(74) *Attorney, Agent, or Firm* — Allen, Dyer, Doppelt, Milbrath & Gilchrist, P.A.

(57) ABSTRACT

A wireless communications system may include wireless communications devices with each including a wireless transceiver and a processor coupled thereto for transmitting and receiving communications and using a challenge-response authentication protocol. The wireless communications devices may also include a master wireless communications device and a slave wireless communications device. The master wireless communications device may transmit a polling message including an unencrypted portion and an initial encrypted challenge portion. The slave wireless communications device may transmit a polling reply message including an unencrypted portion and an initial encrypted response portion based upon receiving the polling message from the master wireless communications device.

31 Claims, 14 Drawing Sheets

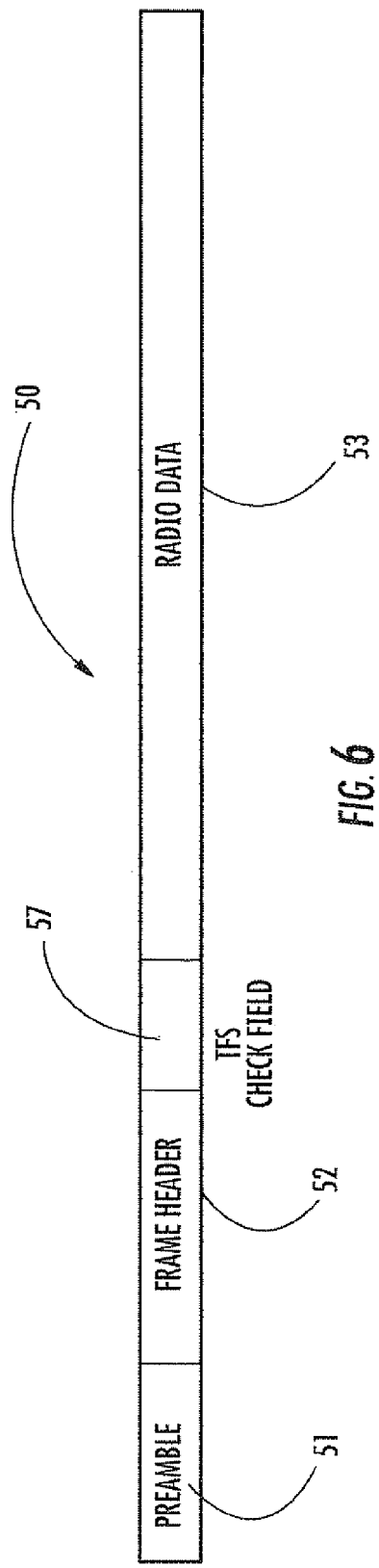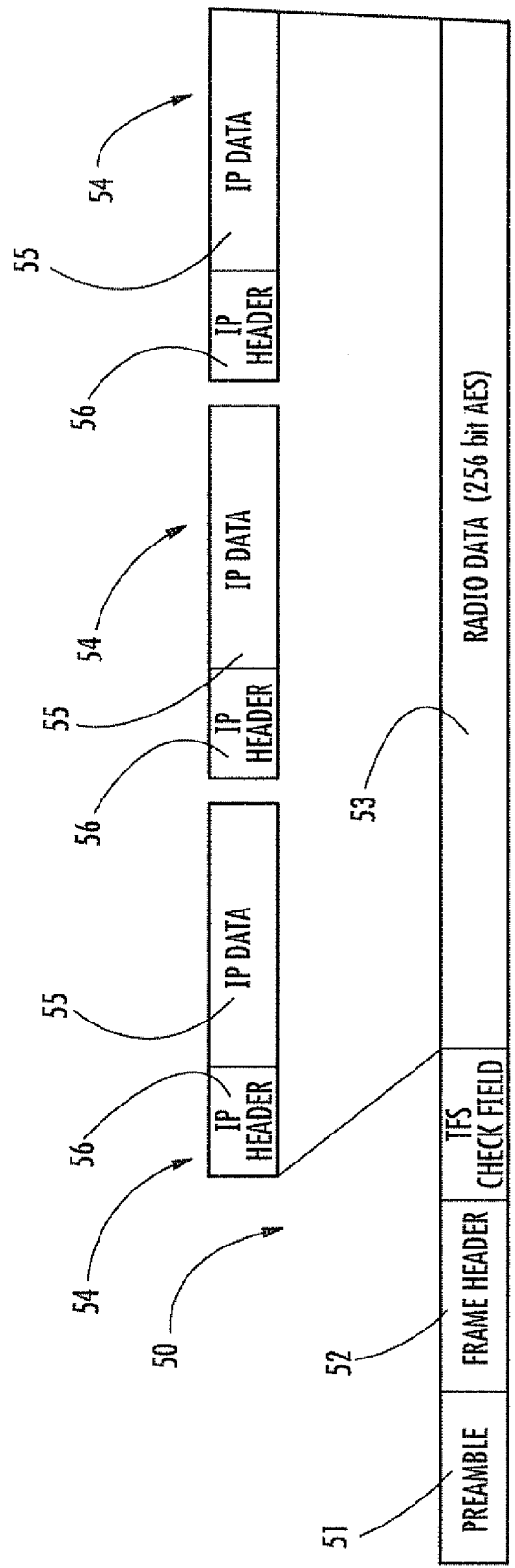

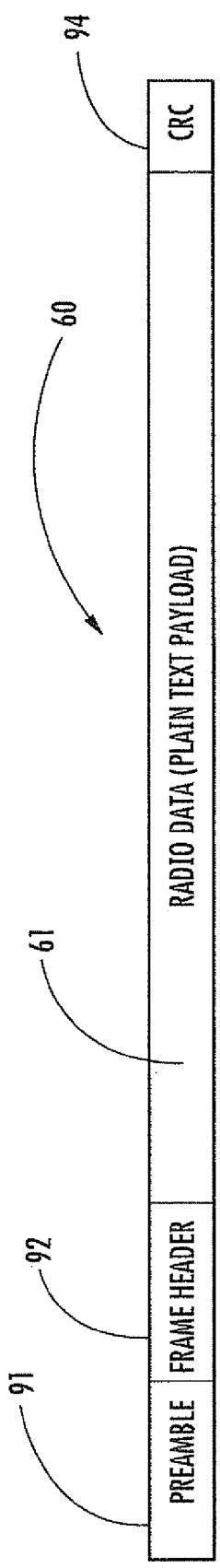
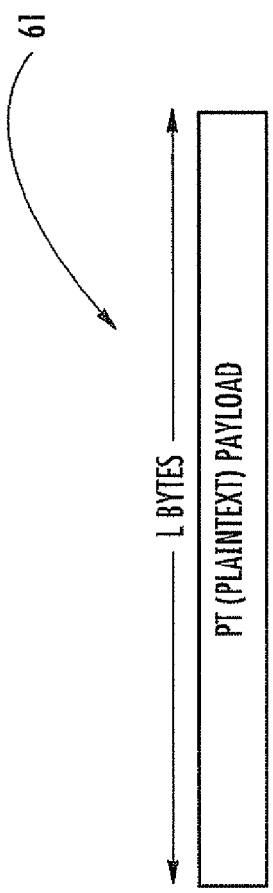
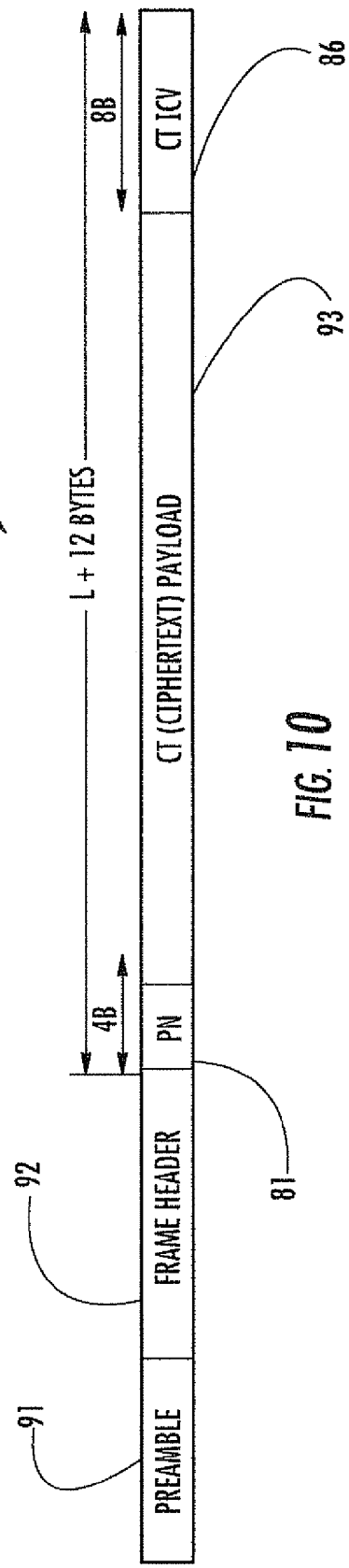
FIG. 8
FIG. 9
FIG. 10

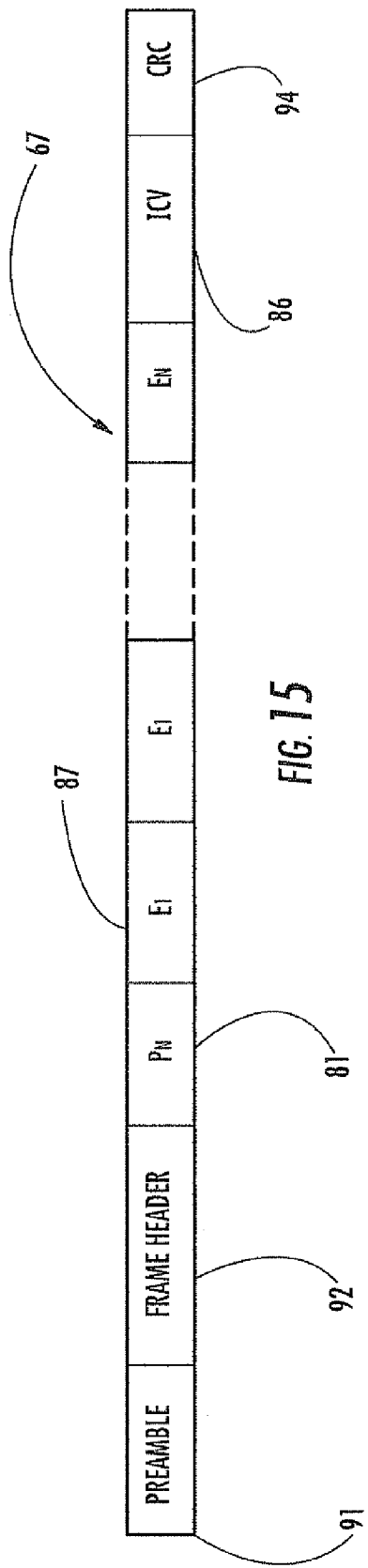
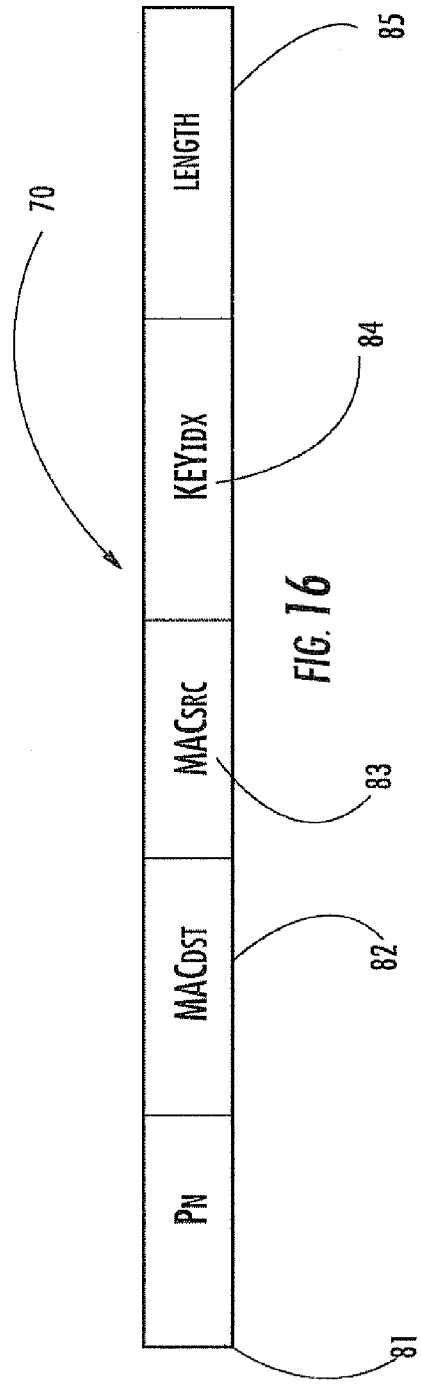
FIG. 15
FIG. 16

US 7,987,363 B2

SECURE WIRELESS COMMUNICATIONS SYSTEM AND RELATED METHOD

FIELD OF THE INVENTION

The present invention relates to the field of communications, and, more particularly, to wireless communications systems and related methods.

BACKGROUND OF THE INVENTION

A typical wireless communications system may comprise a plurality of wireless devices transmitting and receiving messages with each other. These messages are typically arranged in formatted groups of data called packets. Each packet may comprise a header and a payload, the header including a preamble and a frame header. The preamble and frame header are used by each wireless device to decode, to filter, and to process the received information, and are associated with a physical layer of a communication protocol used by the wireless devices. The frame header information may also include information associated with a Media Access Control (MAC) layer. The frame header information may control traffic flow and coordinate modulation, timing, and transmitter/receiver synchronization. The frame header may be used by the wireless communications system for routing the packet to the desired recipient, whereas the payload represents the data generated by a user application to be transmitted. Typically, the size of the packet varies based upon the amount of data in the payload.

As wireless communications systems have become more prevalent, a robust security infrastructure has become desirable. Several approaches to developing such a security infrastructure have been disclosed. For example, the messages transmitted in the wireless communications system may be encrypted using an encryption algorithm, for example, Wired Equivalent Privacy (WEP), Advanced Encryption Standard (AES), and Data Encryption Standard (DES). When a packet is encrypted, typically the payload is encrypted and the preamble and frame header are left unencrypted so that the packet may be correctly identified, decoded, and routed through the wireless communications system. For example, in the IEEE 802.16 WiMAX standard, the payload may be encrypted but the preamble and frame header are left unencrypted. Indeed, in the WiMAX standard, MAC layer management messages may also be unencrypted.

Commercial communication standards may use clear access to preamble or frame header information to maintain interoperability. For example, a IEEE 802.11 or 802.16 system uses the preamble information to identify the presence of other systems in the same frequency range in order to avoid collisions or to determine the least congested wireless frequency range, and a IEEE 802.11a, 802.11g or 802.16e (WiFi) system may use the preamble information to coexist with other systems.

Although typical encryption of messages in the wireless communications system may provide for security of the payload data of a packet, there may be several security drawbacks to the typical encrypted wireless communications system. One such drawback may be the lack of security for the actual transmitted packets. In other words, a system infiltrator, for example, a rogue/infiltrator wireless communications device, may listen to the communications of the system and sniff transmitted packets. Since the typical packet has an unencrypted preamble and header, the rogue/infiltrator wireless communications device may derive sensitive information relating to the source and destination of the communication.

Multilayered communications protocols may be more susceptible to having recognizable traffic patterns. For example, the rogue/infiltrator wireless communications device may derive communication traffic density and flow patterns. The rogue/infiltrator wireless communications device may also deduce certain sensitive events based upon changes in traffic flow.

Moreover, the typical wireless communications system may be subject to denial-of-service (DoS) attacks. Although the rogue/infiltrator wireless communications device listening to transmitted encrypted traffic may not derive the encrypted payload data, during a DoS attack, the rogue/infiltrator wireless communications device may flood the system with rogue messages that mimic the authentic messages. For example, the rogue/infiltrator wireless communications device may broadcast a rogue polling message, which typically causes all wireless communications devices in range to broadcast polling reply messages. During such DoS attacks, the rogue/infiltrator wireless communications device attempts to slow, to reset, and to thereby interfere with legitimate connections. Other possible attacks may comprise, for example, a spoofing attack, traffic injection, eavesdropping, and cloning of wireless communications devices.

The wireless communications devices, assuming that the message is authentic, receive and routinely process the rogue messages, which may have encrypted data. This may cause the wireless communications devices to consume processing resources and battery power before determining they are unauthorized communications and discarding them. During a DoS attack, the infiltrator may flood the network with a large number of rogue messages and bog down the wireless communications devices with the cumbersome task of filtering out the rogue messages, thereby preventing timely processing and transmission of authorized messages.

One approach to the above drawbacks is implementing a challenge-response authentication protocol in the wireless communications system, such as disclosed in U.S. Patent Application Publication No. 2006/0129807 to Halasz et al. The challenge-response authentication protocol typically comprises a first wireless communications device presenting a question ("challenge") and a second wireless communications device may provide a valid answer ("response") to be authenticated. Thereafter, the first and second wireless communications devices may initiate a connection. Nonetheless, a drawback may comprise the infiltrator sniffing out proper responses and subsequently copying the information and using the response information to be played back in a DoS attack. This method may not provide for preamble security and frame header information security. Moreover, the typical wireless communications device using a challenge-response authentication protocol may still send out and reply to appropriate polling messages before transmitting a challenge message to authenticate the companion wireless communications device.

SUMMARY OF THE INVENTION

In view of the foregoing background, it is therefore an object of the present invention to provide a wireless communications system that provides robust security, such as from the rogue/infiltrator wireless communications device.

This and other objects, features, and advantages in accordance with the present invention are provided by a wireless communications system comprising a plurality of wireless communications devices with each comprising a wireless transceiver and a processor coupled thereto for transmitting and receiving communications and using a challenge-response authentication protocol. The wireless communications devices may comprise a master wireless communications device and at least one slave wireless communications device. The master wireless communications device may transmit a polling message including an unencrypted portion and an initial encrypted challenge portion. The slave wireless communications device may transmit a polling reply message including an unencrypted portion and an initial encrypted response portion based upon receiving the polling message from the master wireless communications device. Advantageously, the master wireless communications device may thus process only authenticated polling reply messages and dispose of unauthenticated polling reply messages without consuming significant processing resources.

Moreover, the master wireless communications device upon receiving the polling reply message thereafter may transmit packets to the slave wireless communications device with each packet comprising a respective different subsequent encrypted challenge portion. The slave wireless communications device may transmit return packets to the master wireless communications device with each return packet comprising a respective different subsequent encrypted response portion. Advantageously, each packet transmitted in the wireless communications system may comprise a respective different subsequent encrypted challenge/response portion, thereby reducing the chance of the rogue/infiltrator wireless communications device cloning authentic messages.

In certain embodiments, each of the processors may perform bit stuffing on the communications to satisfy a data throughput threshold. The processors may perform bit stuffing such that the communications appears as synchronous traffic. Advantageously, the rogue/infiltrator wireless communications device may not derive traffic flow patterns by examining traffic density.

Additionally, each of the processors may arrange the communications as a plurality of packets with each packet comprising a predetermined number of bits. Each of the processors may break down packets of a first number of bits being greater than the predetermined number of bits into a plurality of packets of the predetermined number of bits. Furthermore, each of the processors may assemble packets of a second number of bits being less than the predetermined number of bits into at least one packet of the predetermined number of bits. Advantageously, the rogue/infiltrator wireless communications device may not derive traffic flow patterns by examining packet sizes.

In other embodiments, the processor of the master wireless communications device may arrange messages as a plurality of packets with each packet comprising an unencrypted header, at least one of the initial encrypted challenge portion and a different subsequent encrypted challenge portion, and an encrypted payload portion. The processor of the slave wireless communications device may also arrange messages as a plurality of packets with each packet comprising an unencrypted header, at least one of the initial encrypted response portion and a different subsequent encrypted response portion, and an encrypted payload portion.

Additionally, each packet may define a frame structure, and at least one of the initial encrypted challenge portion and the different subsequent encrypted challenge portion may be arranged between the unencrypted header and the encrypted payload portion. In certain embodiments, each of the wireless transceivers may comprise an IEEE 802.16 WiMAX transceiver, for example.

Another aspect is directed to a method of operating a wireless communications system comprising a plurality of wireless communications devices for transmitting and receiving communications and using a challenge-response authentication protocol. The wireless communications devices may comprise a master wireless communications device and at least one slave wireless communications device. The method may comprise transmitting from the master wireless communications device a polling message including an unencrypted portion and an initial encrypted challenge portion, and transmitting from the slave wireless communications device a polling reply message including an unencrypted portion and an initial encrypted response portion based upon receiving the polling message from the master wireless communications device.

BRIEF DESCRIPTION OF THE DRAWINGS

FIG. 6 is a schematic diagram of a packet transmitted in the wireless communications system of FIG. 1.

FIG. 7 is a schematic diagram of packets arranged in the wireless communications system of FIG. 1.

FIG. 8 is a schematic diagram of an unencrypted packet transmitted in the wireless communications system of FIG. 1.

FIG. 9 is a schematic diagram of a radio data (Plain Text) payload before encryption in the wireless communications system of FIG. 1.

FIG. 10 is a schematic diagram of an encrypted packet transmitted in the wireless communications system of FIG. 1.

FIG. 15 is a detailed schematic diagram of an encrypted packet transmitted in the wireless communications system of FIG. 1.

FIG. 16 is a schematic diagram of the structure of the nonce used by the receiver to generate an authentication value in the wireless communications system of FIG. 1.

DETAILED DESCRIPTION OF THE PREFERRED EMBODIMENTS

The present invention may now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure may be thorough and complete, and may fully convey the scope of the invention to those skilled in the art. Like numbers refer to like elements throughout, and prime notation and multiple prime notation are used to indicate similar elements in alternative embodiments.

Figure 1:
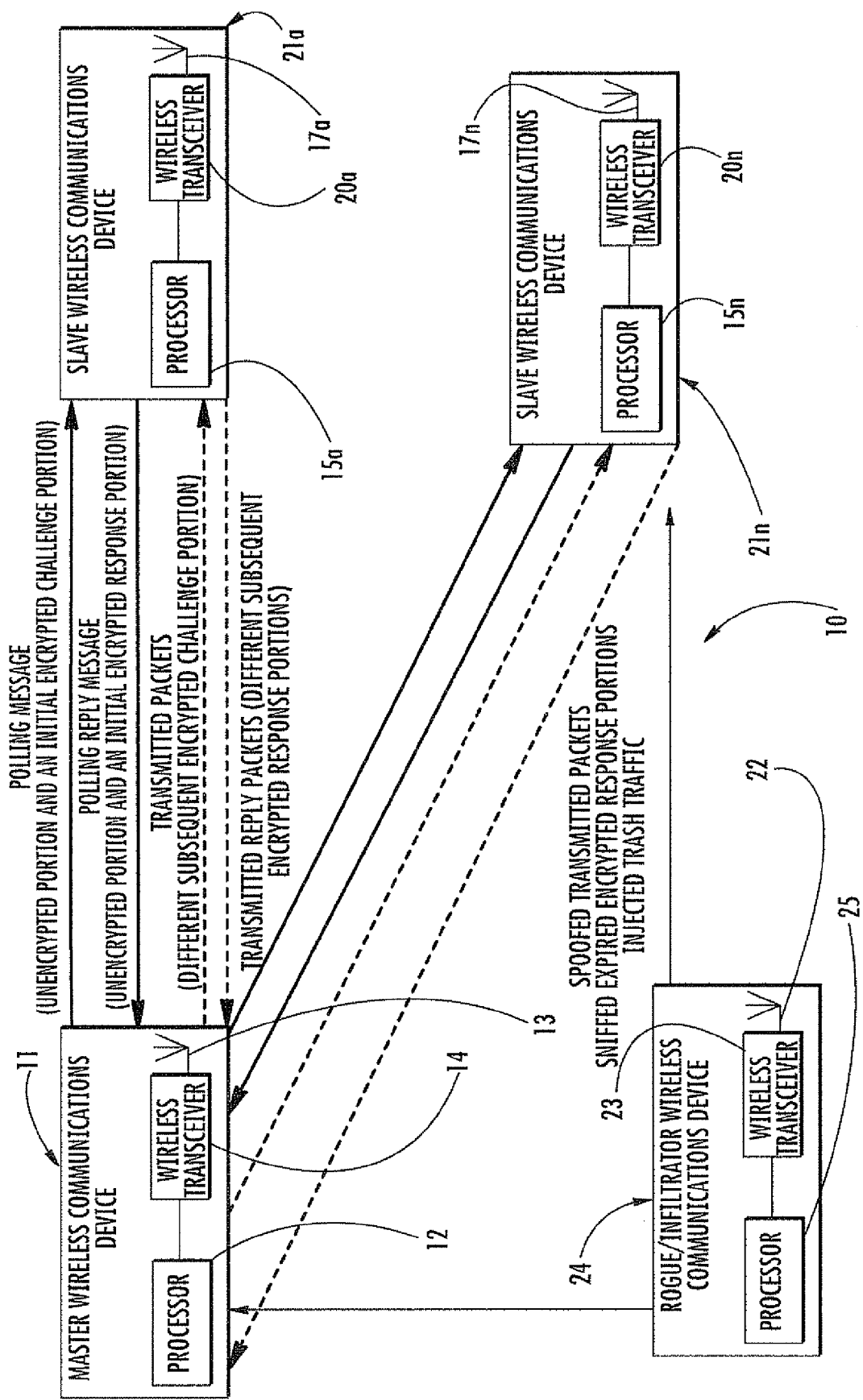
FIG. 1 is schematic diagram of the wireless communications system, according to the present invention.

Referring initially to FIG. 1, a wireless communications system 10 in accordance with the invention is now described. The wireless communications system 10 illustratively includes a plurality of wireless communications devices 11, 21a-21n. Each wireless communications device 11, 21a-21n illustratively includes a respective wireless transceiver 14, 20a-20n, a respective processor 12, 15a-15n coupled to the wireless transceiver, and a respective antenna 13, 17a-20n coupled to the wireless transceiver for transmitting and receiving communications. As may be appreciated by those skilled in the art, the wireless communications system 10 and the respective wireless communications devices 11, 21a-21n may use a challenge-response authentication protocol. Each of the wireless transceivers 14, 20a-20n may comprise, for example, a IEEE 802.16 WiMAX, or a IEEE 802.11 WiFi transceiver.

The wireless communications devices 11, 21a-21n illustratively include a master wireless communications device 11, and a plurality of slave wireless communications devices 21a-21n. The master wireless communications device 11 may comprise an access point, a base station, a relay station, a controller, or a server. The slave wireless communications devices 21a-21n may comprise a wireless station, a subscriber station, a mobile station, or a client. Moreover, the wireless communications system 10 may comprise a plurality of master wireless communications devices, and at least one slave wireless communications device.

A rogue/infiltrator wireless communications device 24 comprises a processor 25, a wireless transceiver 23 coupled to the processor, and an antenna 22 coupled to the wireless transceiver. As may be appreciated by those skilled in the art, the rogue/infiltrator wireless communications device 24 may attempt to gain unauthorized access to data transmitted and received in the wireless communications system 10 by listening to communication in the system. Moreover, as also appreciated by those skilled in the art, the rogue/infiltrator wireless communications device 24 may try to interfere with efficient communication in the wireless communications system 10 by performing at least one of traffic injection, spoofing, and cloning of master and slave wireless communications devices, and launching DoS and replay attacks.

Referring now briefly and additionally to FIGS. 6 and 7, each of the processors 12, 15a-15n arranges the communications as a plurality of packets with each packet 50 comprising a predetermined number of bits or bytes. In other words, each packet is the same size of bits. The packet size may remain constant or may alternatively change periodically, for example, changing after a number of frames have been transmitted or after a set period of time. As may be appreciated by those skilled in the art, each wireless communications device 11, 21a-21n generates data for transmission that is arranged as packets 54 of variable size. Additionally, each packet 50 defines a frame structure, which is illustrated in FIG. 6. As may be appreciated by those skilled in the art, this packet structure may apply to most wireless systems in use, for example, IEEE 802.16 WiMAX, IEEE 802.11 WiFi, and IEEE 802.15.

The frame structure of the packet 50 illustratively includes an encrypted portion 57 arranged between an unencrypted header 52 and preamble 51 and an encrypted payload portion 53. The unencrypted header 52 and preamble 51 may include system information, for example, routing data, and the encrypted payload portion 53 may include user related information for transmission. The encrypted portion 57 may comprise at least one of an encrypted challenge portion and an encrypted response portion. The encrypted response portion may comprise information the master wireless communications device 11 knows about the transmitting slave wireless communications device 21a-21n, for example, network time, MAC address, transmission range, and frequency offset. The encryption algorithm may comprise, for example, 256 bit AES, DES, or WEP. As may be appreciated by those skilled in the art, the encryption key may be temporal and changed periodically to enhance the security of the wireless communications system 10.

The frame structure of the packet 50 has an unencrypted header 52 and preamble 51. Accordingly, the components of the wireless communications devices 11, 21a-21n, for example, processors 12, 15a-15n, wireless transceivers 14, 20a-20n, and antennas 13, 17a-17n, may be provided from commercially available components, i.e. commercial-off-the-shelf (COTS). Advantageously, the frame structure of the packet 50 of the wireless communications system 10 may be compliant with the IEEE 802.16 WiMAX standard. The encrypted challenge portion and encrypted response portion 57 may be implemented throughout the frame structure of the IEEE 802.16 WiMAX standard, for example, preamble fields, frame control header, MAC headers, subheader fields, downlink and uplink burst frames, and MAC management/control message fields.

In certain embodiments, the encrypted challenge portion 57 may be part of the encrypted payload portion 53, and advantageously, does not affect the protocol operation of the wireless communications system 10 nor its interoperability. The encrypted challenge portion 57 may include a data field part of a unique, nonce, structure. The nonce is created using information known only to the legitimate master 11 or slave 21a-21n wireless communications device. The structure may include several data fields based on information known about the transmitter by the receiver: a network time, destination MAC addresses, source MAC addresses, a range, and a frequency offset, etc.

The data field values are based on secret shared information and include: index of an encryption key to be used, time varying data fields, a counter used for a key expiration mechanism, and a length of the frame. In other words, the data fields provide the validation data for each packet of data. New validation data is generated at the start of each packet exchange session between any two wireless communications devices 11, 21a-21n. Moreover, the validation data may be time dependent, i.e. being valid for a short period of time and thereafter invalid.

The frame structure of the packet 50 may include a second unencrypted portion for cooperating with the encrypted challenge portion 57. For example, the second unencrypted portion may include a portion of the challenge and the encrypted challenge portion 57 may include a portion of the challenge. Accordingly, the legitimate slave wireless communications device 21a-21n may only decrypt the encrypted challenge portion 57 and generate a proper reply. Advantageously, the performance of the processors 15a-15n of the slave wireless communications devices 21a-21n is improved since decryption workload is reduced, i.e. the processors have to decrypt less data to authenticate transmissions.

Moreover, each of the processors 12, 15a-15n breaks down packets (IP data) of a first number of bits being greater than the predetermined number of bits into a plurality of packets 50 of the predetermined number of bits (radio data). Furthermore, each of the processors 12, 15a-15n may assemble packets of a second number of bits being less than the predetermined number of bits into at least one packet 50 of the predetermined number of bits. When assembling packets into a packet of the predetermined number of bits, if there are leftover bits needed to complete a packet, the processors 12, 15a-15n may insert dummy bits to complete the packet. Advantageously, the packets transmitted and received in the wireless communications system 10 are each the same size. Accordingly, the rogue/infiltrator wireless communications device 24 may not derive traffic flow patterns by examining packet sizes.

Referring again to FIG. 1, the master wireless device 11 and the slave wireless communications device 21a-21n transmit polling messages and polling reply messages, respectively, to initiate a wireless connection. The master wireless communications device 11 transmits a polling message, for example, a beacon message, that illustratively includes an unencrypted portion 51, 52 and an initial encrypted challenge portion 57. (FIG. 1, shown with solid arrows). Upon receipt of the polling message, the slave wireless communications devices 21a-21n transmit a polling reply message that illustratively includes an unencrypted portion 51, 52 and an initial encrypted response portion 57 based upon receiving the polling message from the master wireless communications device 11. (FIG. 1, shown with solid arrows).

As may be appreciated by those skilled in the art, the master wireless communications device 11 may process only authenticated polling reply messages by selectively processing only polling reply messages with proper initial encrypted response portions 57. As also appreciated by those skilled in the art, the slave wireless communications devices 21a-21n may process only authenticated polling messages by selectively processing only polling messages with proper initial encrypted challenge portions 57. In other words, the master and slave wireless communications devices 11, 21a-21n selectively filter out rogue messages and/or packets generated by the rogue/infiltrator wireless communications device 24.

After the master wireless communications device 11 receives an authenticated polling reply message having a proper encrypted response portion, the master wireless communications device 11 thereafter transmits packets to the slave wireless communications devices 21a-21n with each packet comprising a respective different subsequent encrypted challenge portion 57. (FIG. 1, shown with dotted arrows). Also, the slave wireless communications devices 21a-21n transmit return packets to the master wireless communications device 11 with each return packet comprising a respective different subsequent encrypted response portion 57. In other words, each packet transmitted and received in the wireless communications system 10 includes a different encrypted challenge or response portion. (FIG. 1, shown with dotted arrows). In other words, the master and slave wireless communications devices 11, 21a-21n advantageously authenticate the source of received communications on a packet-by-packet basis.

Accordingly, while the master wireless communications device 11 maintains a connection with a particular slave wireless communications device 21a-21n, during which, the master wireless communications device sends a packet of data to the slave wireless communications device, the master wireless communications device awaits an authentic reply packet with the proper encrypted response portion, and does not process received packets with improper encrypted response portions. Advantageously, the rogue/infiltrator wireless communications device 24 performing traffic injection or a DoS attack may not overburden the master wireless communications device 11 of the wireless communications system 10 by forcing it to process the injected and cloned traffic.

Furthermore, each of the processors 12, 15a-15n of the wireless communications system 10 may perform bit stuffing on the communications to satisfy a data throughput threshold. More specifically, the data throughput level may comprise the maximum traffic throughout for the wireless communications system 10. The processors 12, 15a-15n also may perform bit stuffing such that the communications appears as synchronous traffic. Furthermore, the processors 12, 15a-15n of the wireless communications system 10 may encrypt the dummy data used to perform bit stuffing.

Advantageously, the rogue/infiltrator wireless communications device 24 covertly listening to the traffic of the wireless communications system 10 may not easily derive traffic flow patterns. To the rogue/infiltrator wireless communications device 24, the traffic flow of the wireless communications system 10 always appears to be at a maximum and at a smooth consistent flow. In other words, if the rogue/infiltrator wireless communications device 24 examines the communications flow of the wireless communications system 10, no discernible pattern should be available. Furthermore, the wireless communications system 10 may prevent the rogue/infiltrator wireless communications device 24 from correlating the amount of data traffic being transmitted with an occurrence or event.

Figure 2:
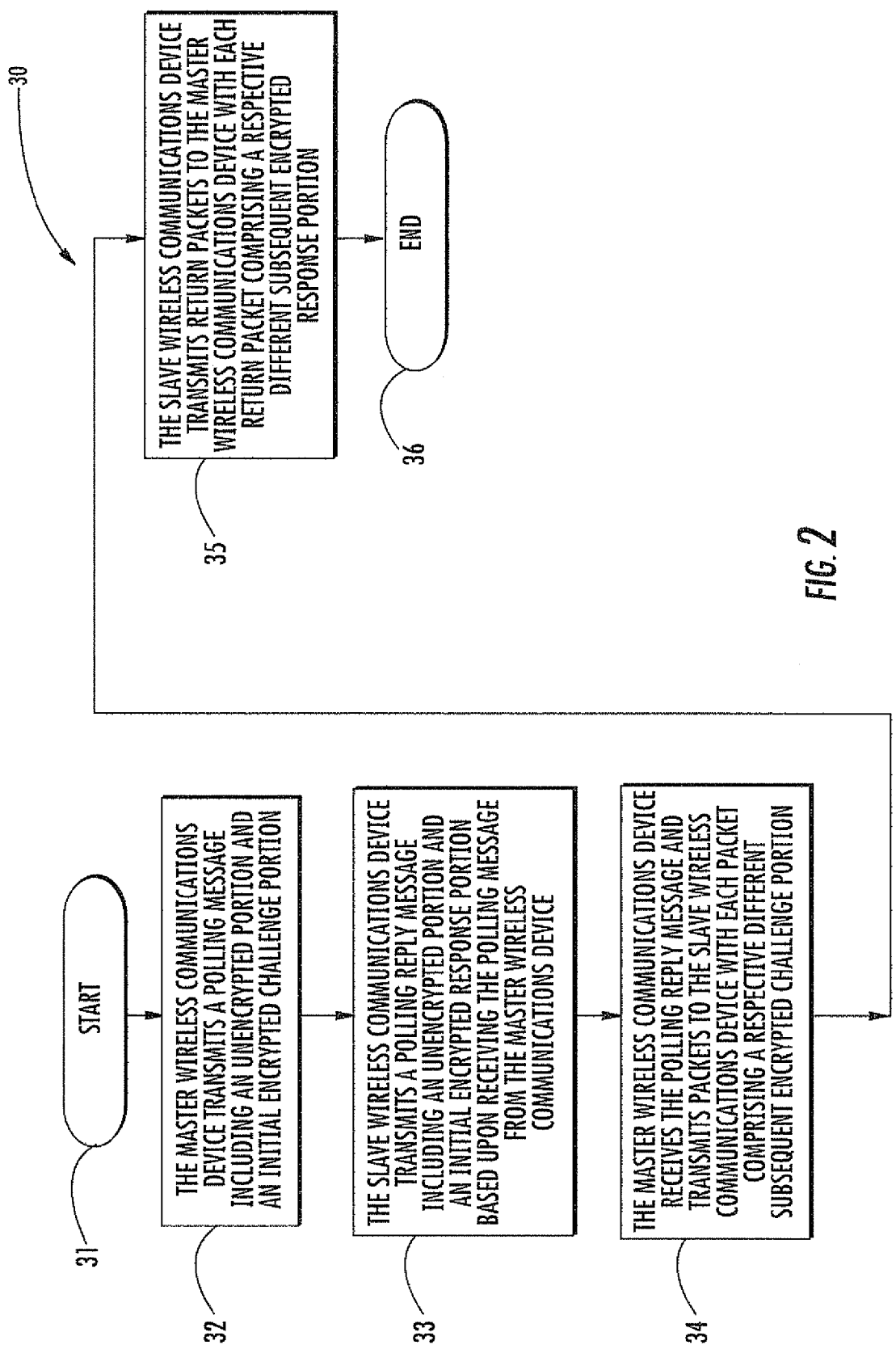
FIG. 2 is a flowchart illustrating a method of operating the wireless communications system of FIG. 1.

Referring now additionally to FIG. 2, a flowchart 30 is illustrated and describes another aspect directed to a method of operating a wireless communications system 10 that illustratively includes a plurality of wireless communications devices 11, 21a-21n with each comprising a wireless transceiver 14, 20a-20n, a processor 12, 15a-15n coupled to the wireless transceiver, and an antenna 13, 17a-20n for transmitting and receiving communications and using a challenge-response authentication protocol.

The method begins at Block 31 and illustratively includes transmitting at Block 32 from the master wireless communications device 11 a polling message including an unencrypted portion 51, 52 and an initial encrypted challenge portion 57. The method also illustratively includes transmitting at Block 33 from the slave wireless communications devices 21a-21n a polling reply message including an unencrypted portion 51, 52 and an initial encrypted response portion 57 based upon receiving the polling message from the master wireless communications device 11. The master wireless communications device 11 then receives at Block 34 the polling reply message and transmits packets to the slave wireless communications devices 21a-21n with each packet comprising a respective different subsequent encrypted challenge portion 57. Upon receipt of the transmitted packets, the slave wireless communications devices 21a-21n transmit at Block 35 return packets to the master wireless communications device 11 with each return packet comprising a respective different subsequent encrypted response portion 57. The method ends at Block 36.

Figure 3:
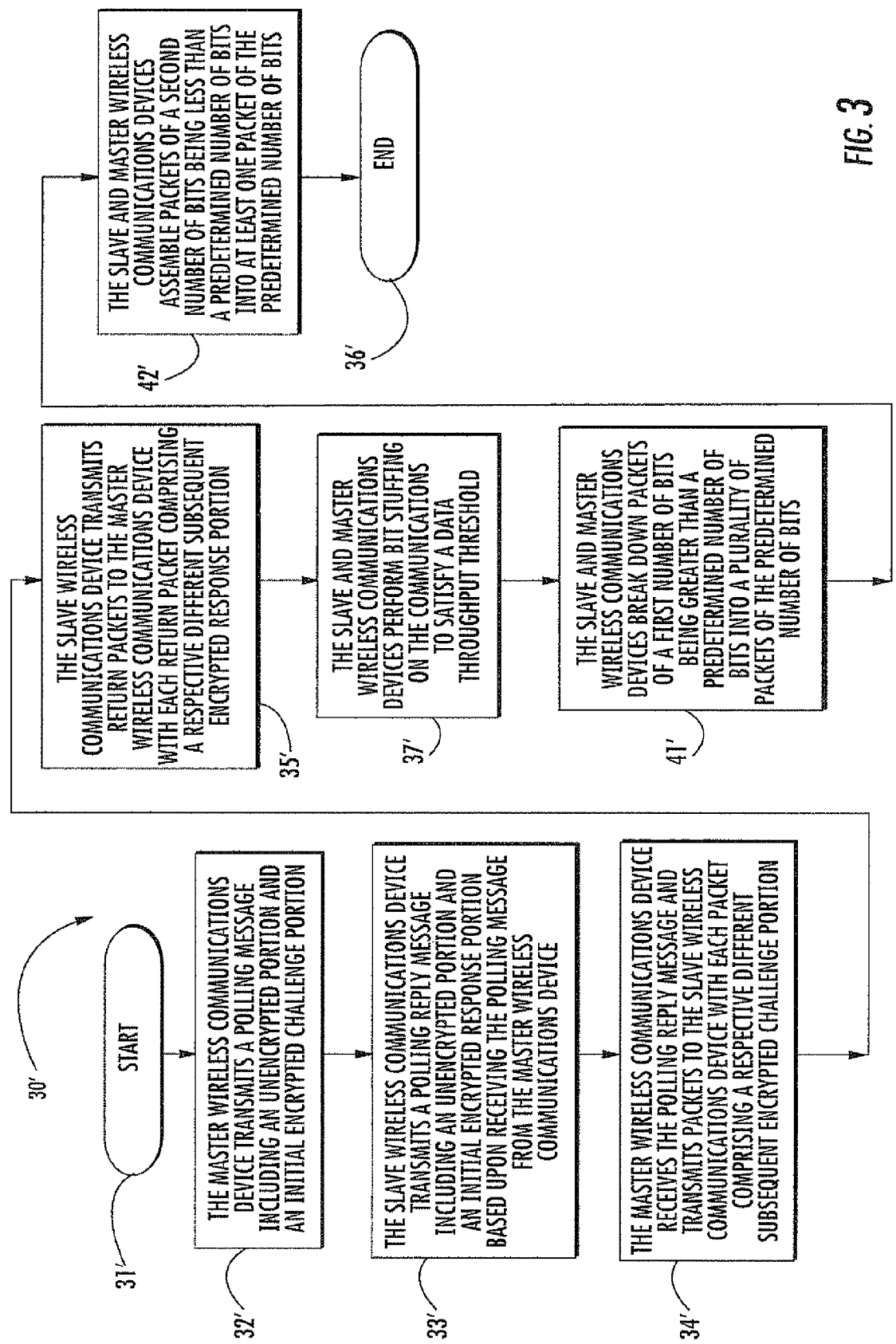
FIG. 3 is a flowchart illustrating a second embodiment of the method of operating the wireless communications system of FIG. 1.

Referring now additionally to FIG. 3, another embodiment of the method is now described. In this embodiment of the method, those elements already discussed above with respect to FIG. 2 are given prime notation and most require no further discussion herein. This embodiment differs from the previous embodiment in that the method further comprises the step of the slave and master wireless communications devices 11, 21a-21n performing at Block 37' bit stuffing on the communications to satisfy a data throughput threshold. The method also further comprises the slave and master wireless communications devices 11, 21a-21n breaking down at Block 41' packets of a first number of bits being greater than a predetermined number of bits into a plurality of packets of the predetermined number of bits, and assembling at Block 42' packets of a second number of bits being less than a predetermined number of bits into at least one packet of the predetermined number of bits.

Figure 4:
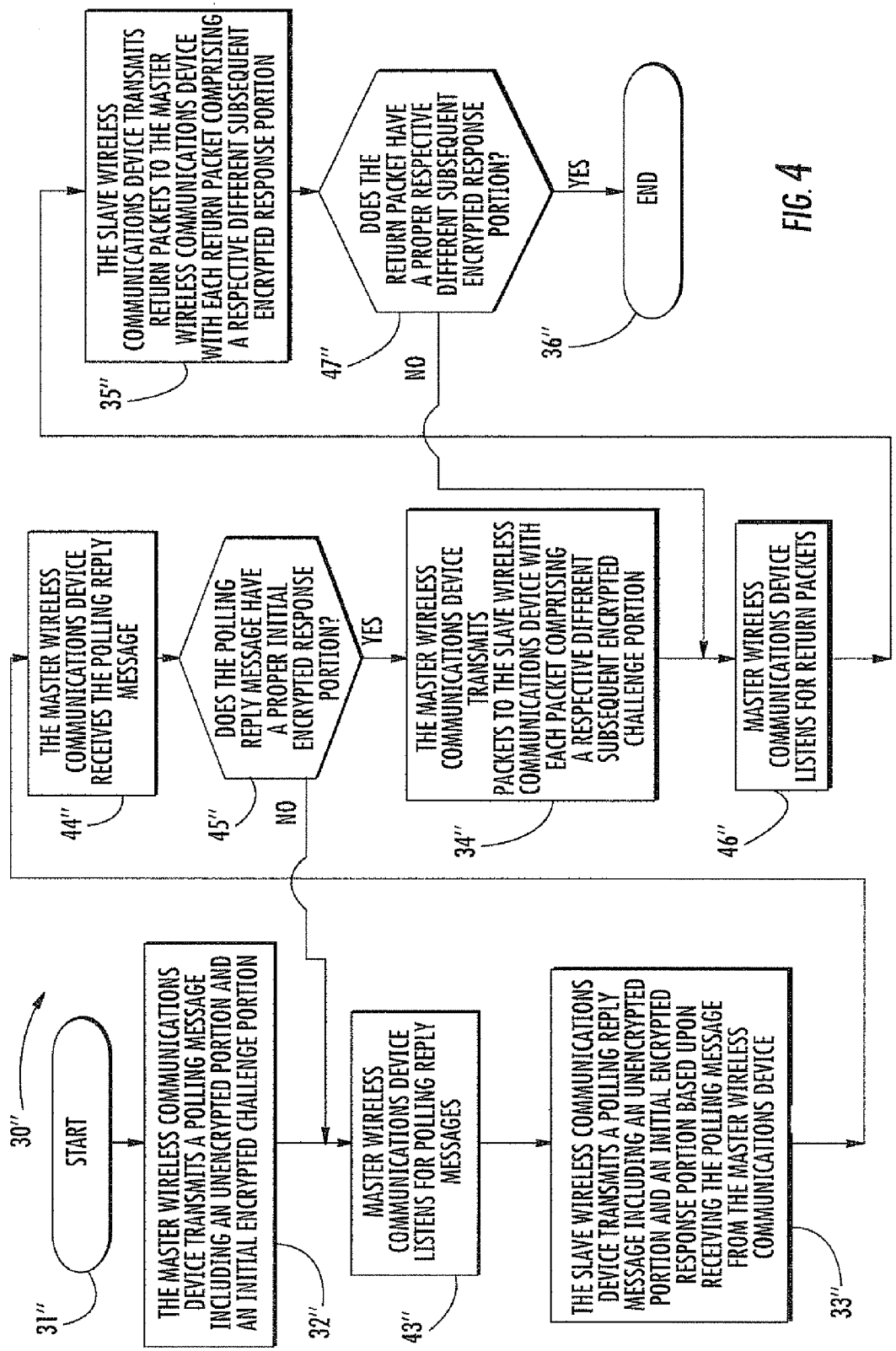
FIG. 4 is a flowchart illustrating a third embodiment of the method of operating the wireless communications system of FIG. 1.

Referring now additionally to FIG. 4, another embodiment of the method is now described. In this embodiment of the method, those elements already discussed above with respect to FIGS. 2-3 are given double prime notation and most require no further discussion herein. This embodiment differs from the previous embodiments in that the method further comprises the step of the master wireless communications device 11 listening at Block 43" for polling reply messages, and the master wireless communications device receiving at Block 44" the polling reply message.

Upon receipt of the polling reply message at Block 44", the master wireless communications device 11 filters at Block 45" incoming packets for processing based upon the authentication of the encrypted response portion 57. If the incoming packet has an improper encrypted response portion 57, for example, being transmitted by the rogue/infiltrator wireless communications device 24, the master wireless communications device does not process the packet any further, for example, by decoding the encrypted payload portion 53 and continues listen for proper polling reply messages at Block 43". If the incoming packet has a proper encrypted response portion 57, for example, being transmitted by one of the slave wireless communications devices 21a-21n, the master wireless communications device 11 processes the packet further, for example, by decoding the encrypted payload portion 53, and moves on to the next step of transmitting at Block 34" packets to the appropriate slave wireless communications devices 21a-21n.

This embodiment of the method also further includes the step of the master wireless communications device 11 listening at Block 46" for return packets from the slave wireless communications devices 21a-21n, and filtering the return packets from the slave wireless communications devices by examining at Block 47" the respective different subsequent encrypted response portion 57 of each packet. If the respective different subsequent encrypted response portion 57 is proper, the method continues transmission and ends (Block 36"). If the respective different subsequent encrypted response portion 57 is improper, the method returns to Block 46".

Figure 5:
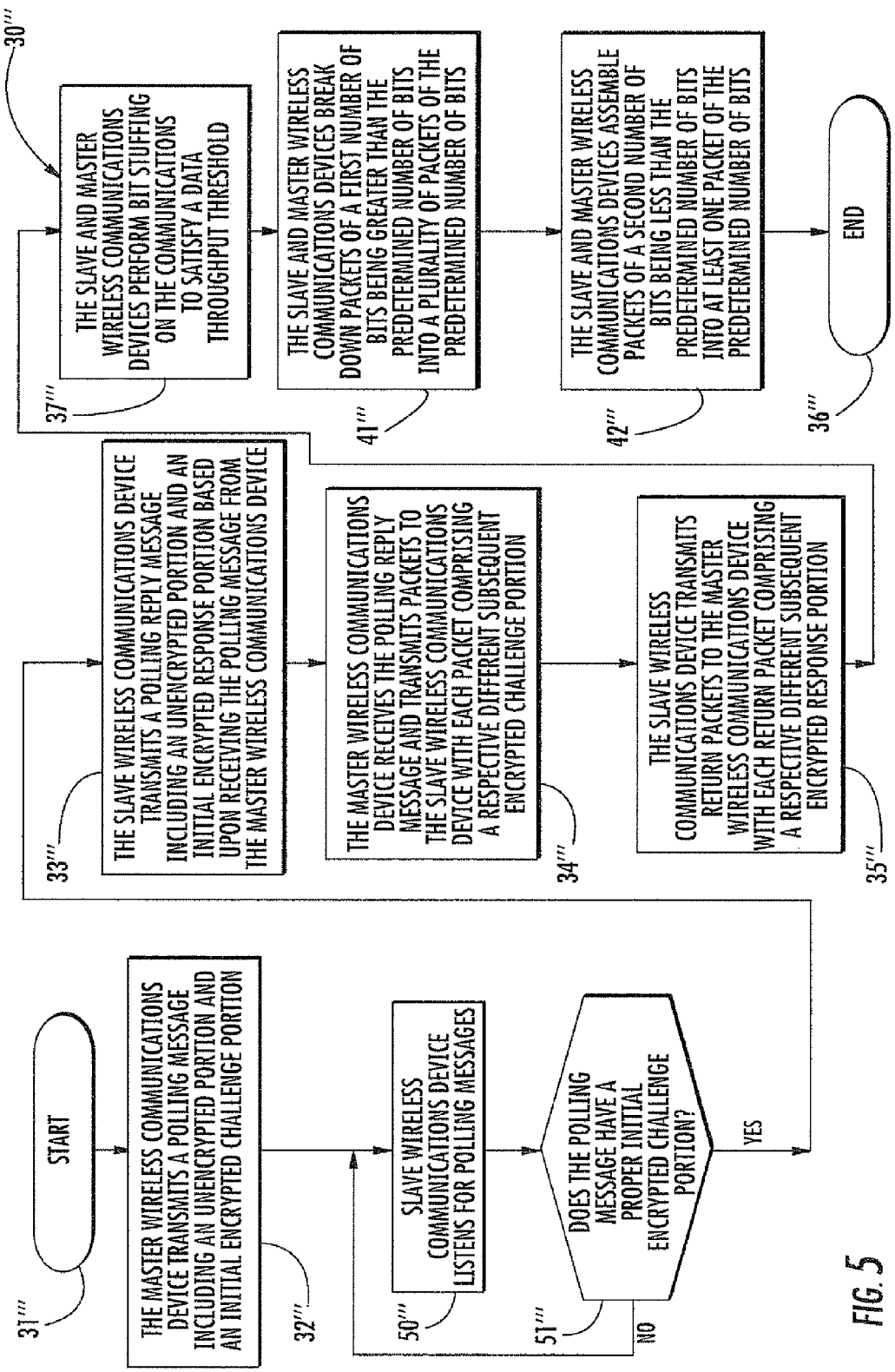
FIG. 5 is a flowchart illustrating a fourth embodiment of the method of operating the wireless communications system of FIG. 1.

Referring now additionally to FIG. 5, another embodiment of the method is now described. In this embodiment of the method, those elements already discussed above with respect to FIGS. 2-4 are given triple prime notation and most require no further discussion herein. This embodiment differs from the previous embodiments in that the method further comprises the step of the slave wireless communications devices 21a-21n listening at Block 50'" for polling messages from the master wireless communications device 11, and thereafter examining at Block 51'" the initial encrypted challenge portion 57 for authenticity. If the initial encrypted challenge portion 57 is proper, the method moves on to Block 33'". If the initial encrypted challenge portion 57 is improper, the method returns back to Block 50'" and continues to listen for proper polling messages from the master wireless communications device 11. As may be appreciated by those skilled in the art, the method of operating a wireless communications system 10 illustrated in FIG. 1 may be implemented with some or all of the additional features of the embodiments described FIGS. 3-5.

As may be appreciated by those skilled in the art, an exemplary implementation of the wireless communications system 10 follows for illustration purposes.

Traffic Flow Security High Level Functionality: Traffic Flow Security specified herein may be referred to as the "TFS". The overall objectives for the TFS implementation may be to address the following basic elements: data encryption/decryption, TFS validation, preamble security (preamble validation), synchronization information security (frame header and MAC management) (In other words, the preamble and frame header fields are in the clear and the validation method has to be functionally linked with other requirements), key establishment, system authentication, key generation, and data rate smoothing.

TFS Implementation: The following section describes the overall implementation of TFS. It highlights some high level requirements and establishes base methodology. For example, TFS functionality may be implemented with the data encryption system within a RF-7800W, the designation of a line of products offered by the Harris Corporation of Melbourne, Fla., the present assignee of the present invention. As will be appreciated by those skilled in the art, the TFS method may be implemented with any wireless communications device with suitable capabilities. TFS may be user selectable, and when selected, may enable data encryption.

The cryptographic module used for the TFS implementation may be based on specific National Institute of Standards Technology (US NIST) recommendations and Federal Information Processing Standard (FIPS) approved algorithms. Any communicating RF-7800W Master-Slave system uses two logical communication channels (management channel: used for all the information exchanged between units, for network entry, for key management operations, and for system authentication; and the data channel: used for all user application data exchanged between end nodes). The data channel may be disabled at the start of network entry, during key establishment, and during system authentication processing. The data channel may be enabled only if the system authentication has been completed successfully.

TFS Link Authentication High Level Algorithm: The following description outlines the TFS link authentication and initial data key generation. In other words, a summary of how to connect the TFS method with the exemplary implementation in such a way that the outcome can be verified along the way and to meet the overall objectives. The link authentication algorithm may follow the outlined high level algorithm.
a.) Communications over the RF-7800W wireless channel may be encrypted from the very first transmission. b.) Prior to each communication initiated, a RF-7800W node may generate a set of parameters used to verify and validate the link.
c.) A base station may continue to poll at a predefined interval until a valid subscriber station responds. d.) Each poll message may be unique (nonce) and all information contained within the poll may be encrypted. e.) A subscriber station may verify and validate the message. f.) The message may be discarded if validation fails. g.) A new set of validation data may be generated at the start of every new session. h.) Upon successful validation, a subscriber station may use the data received from the base station to calculate a shared secret key.

i.) After each poll message, the base station may listen for a subscriber station to respond with a correct key and the correct validation parameters. j.) The message sent by a subscriber station may be unique (nonce) and based specifically on information contained within the encrypted poll message it received from the corresponding base station. k.) Both the subscriber and the base station may compute the shared secret key using its own parameters and then the parameters received from each other. l.) If the results are not equal, then all the messages may be discarded and the session may be closed. m.) If the results are equal, then the base station may initiate the authentication process by transmitting an authentication request message. n.) Both the subscriber and the base station may use this new shared secret key for the encryption/decryption process. o.) The subscriber station may verify and validate the message.

p.) Upon successful validation, the subscriber station may respond with a challenge token. q.) The base station may verify and validate the message. r.) Upon successful validation, the base station may respond with an authentication token. s.) Should a base station receive a non-valid response, it may ignore the response and maintain its poll interval. t.) The subscriber station may verify and validate the message. u.) Upon successful validation, the base station may respond with an authentication token. v.) The authentication token may include a partial shared secret certificate, a digital signature, and other data fields to be authenticated.

w.) Upon successful completion of the authentication process, the data channel may be open. x.) Key re-generation may be based on a counter that triggers the regeneration. y.) Key re-generation trigger count may be random. z.) If at any time, the link should fail, the system may return to initial authentication.

Encryption/Decryption implementation: The following section outlines the encryption and decryption implementation that is used throughout the TFS algorithm. In other words, the specific NIST/FIPS requirements are outlined along with the adjustments to the TFS method to coexist with the requirements. This encryption algorithm may be present in link authentication (management channel) and data encryption (data channel).

The implementation of encryption, decryption, and data authentication may use an AES core in compliance with the NIST AES FIPS PUB 197, CCM mode. This standard specifies the Rijndael algorithm, a symmetric block cipher that can process data blocks of 128 bits, using cipher keys with lengths of 128, 192, and 256 bits.

The AES algorithm may employ three different key lengths for data encryption (the data channel). They may be user selectable key sizes of 128, 192, or 256 bits. These different "flavors" may be referred to as: "AES-128," "AES-192," and "AES-256." The AES key size for the management channel messages (Link Authentication Key, etc.) may be 256 bits.

Frames may be encrypted and authenticated with an AES-CCM mode. AES-CCM mode is a FIPS compliant security mode referred to as CCM mode (CTR with CBC-MAC), where CTR is a counter and CBC-MAC is a cipher block Chaining Message Authentication Code).

Frame structure: Referring now to FIGS. 8-10, the structure of an RF-7800W unencrypted frame 60 is illustrated. The structure of an RF-7800W encrypted frame using the TFS check field may be compliant with AES-CCM Payload Format, while still performing the TFS check field validation. FIG. 9 illustrates radio data (Plain Text) payload 61 before encryption, and FIG. 10 illustrates a RF-7800W frame 62 after encryption and a TFS check field (FIG. 10). The frame 60 also illustratively includes a cyclic redundancy check 94 (CRC), a preamble 91, and a frame header 92. The encrypted frame 62 illustratively further includes a cipher text payload 93.

In FIG. 10, the implementation of the TFS method uses the option of the TFS Check Field as one of the data fields in the unique structure (nonce) $P_N$ field to follow the AES-CCM Payload Format. In this case, the TFS Check Field=$P_N$, a counter used by the receiver to generate its nonce and detect when the decryption key needs to be changed. As will be appreciated by those skilled in the art, another data field may be used or added to the unique structure.

Figure 11:
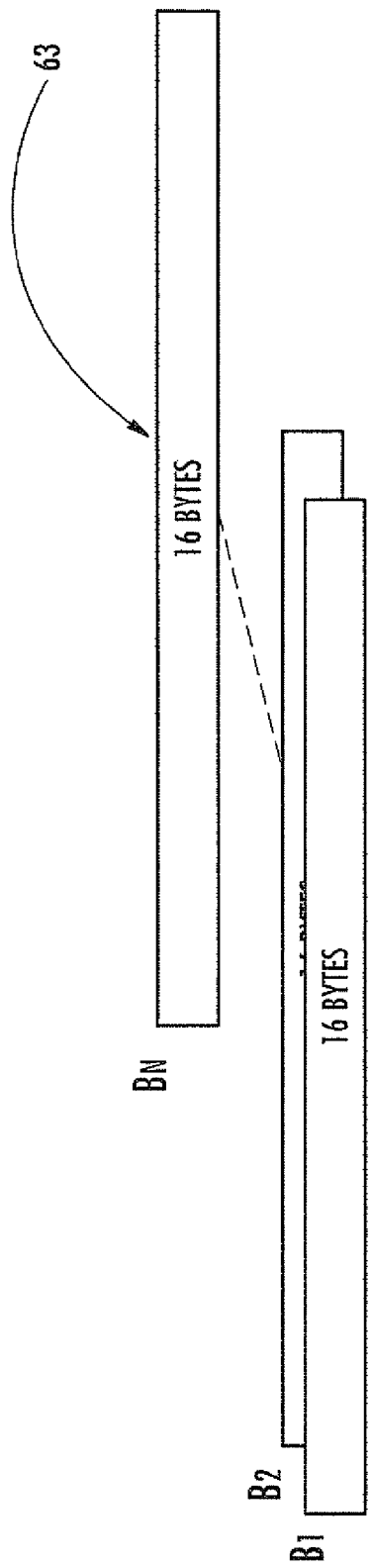
FIG. 11 is a schematic diagram of payload processing for producing an authentication value in the wireless communications system of FIG. 1.

Data Encryption Both the management channel and the data channel information may be encrypted. The following is a description of the data encryption used for both channels. In other words, this is describing AES Encryption/Decryption so that the TFS fields are used to connect it with TFS method. (The remaining portions do not deal with the TFS method directly) The data in both of these channels is generically referred to as "radio data". Referring additionally to FIG. 11, the payload processing is illustrated. During the encryption, the CBC-MAC may be used to process the radio data to produce an authentication value. CTR (Counter) mode may be used to encrypt the authentication value, encrypt radio data, and encrypt plain text payload. The encryption process may first divide the radio data, plain text payload, in 16 Bytes blocks 63, $B_1$ to $B_N$. The last block created, $B_N$ may require padding with 0s.

Figure 12:
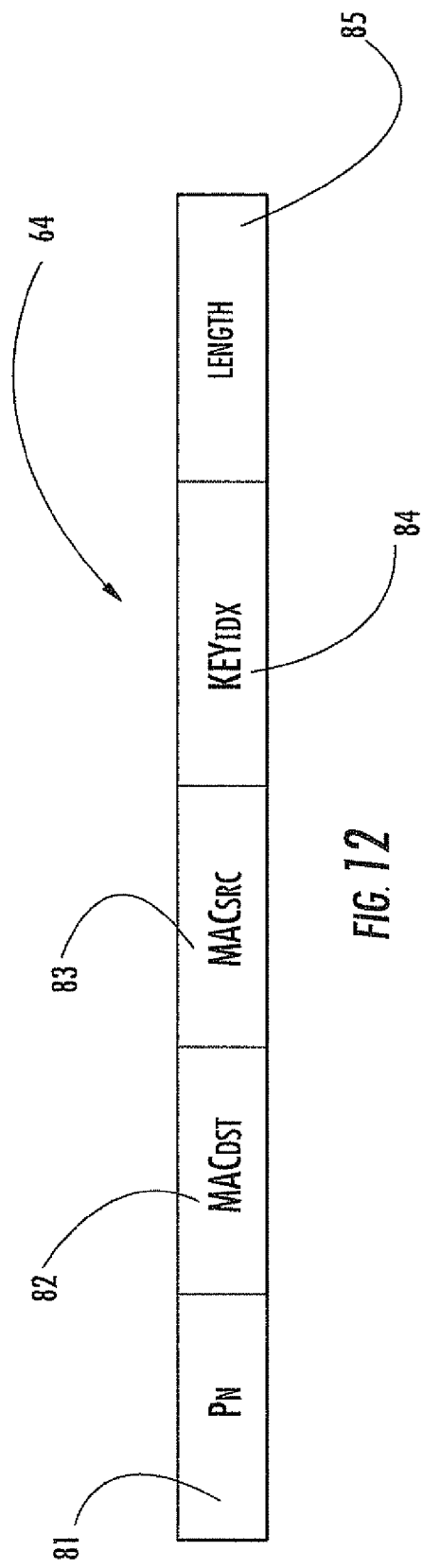
FIG. 12 is a schematic diagram of a $B_0$ (nonce) transmitted structure in the wireless communications system of FIG. 1.

Referring additionally to FIG. 12, a $B_0$ block (nonce) transmitted structure 64 is illustrated. The $B_0$ (nonce) 64 may be created using $P_N$ 81, a counter used for key expiration mechanism, see TFS Validation section, destination MAC addresses 82, source MAC addresses 83, a key index 84, and the length 85 of the frame.

Figure 13:
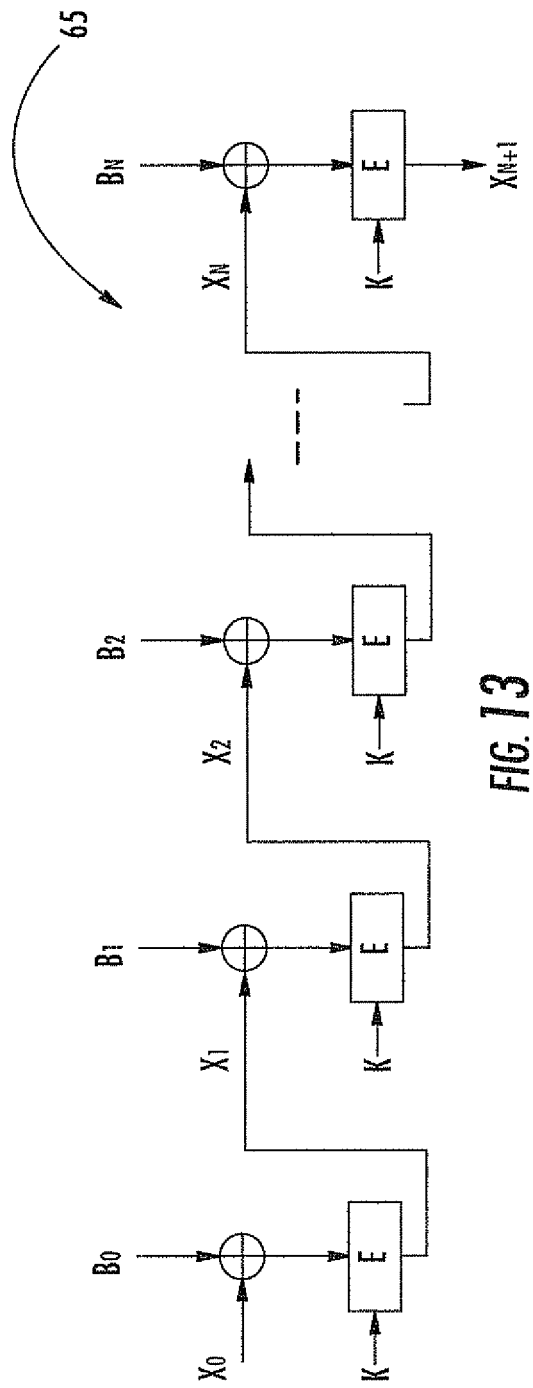
FIG. 13 is a schematic diagram of radio data authentication value generation in the wireless communications system of FIG. 1.

Referring additionally to FIG. 13, a diagram 65 illustrates radio data authentication value generation. In the diagram 65, K=user secret key, E=AES Rinjdael block cipher, IV=initialization vector, IV=0, $X_0$=IV, $X_1$=E(K, $B_0$), $X_{n+1}$=E (K, $X_n \oplus B_n$), for n=1, ..., N−1, N. The first 8 bytes of $X_{N+1}$ may be used as an authentication value, T=$[X_{N+1}]0 \ldots 7$. As will be appreciated by those skilled in the art, the diagram 65 is one exemplary implementation and the TFS method may be implemented with any proprietary implementation.

Figure 14:
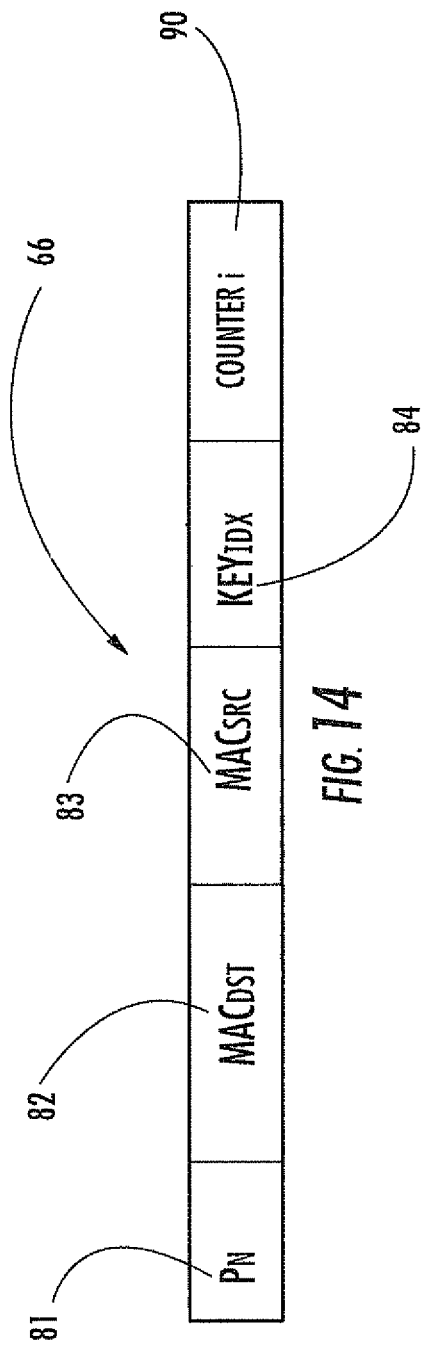
FIG. 14 is a schematic diagram of the structure for a nonce used for encryption of payload data in the wireless communications system of FIG. 1.

Referring additionally to FIG. 14, the structure for the $A_i$ block 66 is illustrated. For encryption, the core may expand the user key using $A_i$ 66. The block $A_i$ 66, a 16 byte block, may be created using $P_N$ 81, a counter used for key expiration mechanism, see TFS validation section, destination MAC addresses 82, source MAC addresses 83, a key index 84, and a counter 90. The TFS check field choices are made based upon maintaining compatibility with NIST/FIPS.

Referring additionally to FIG. 15, the RF-7800W encrypted frame structure 67 is illustrated. The frame structure also illustratively includes a cyclic redundancy check 94 (CRC). The encrypted data may be obtained performing the following processing: expanded key-$S_i$=E(K,$A_i$); cyphertext encrypted data 87 $E_i$=$B_i \oplus S_i$. The authentication block may be based on the first 8 bytes of $S_0$ to obtain the Integrity Check Value 86 (ICV), ICV=T$\oplus[S_0]0 \ldots 7$. The output encrypted frame structure 67 of an RF-7800W is based on encrypted data and an encrypted authentication string ICV.

Data Decryption: Decryption is performed in a similar way as the encryption process but in a reverse order. The encrypted data may be decrypted using CTR mode, which is identical with the encryption process described above. A CBC-MAC phase may be performed on the nonce of the receiver and may continue on the decrypted data as described above. The result of this CBC-MAC processing may be to calculate ICV. The ICV calculated is then compared with the ICV received, and if they are different, the frame may be discarded.

TFS Validation implementation (Specific translation of the TFS method to the RF-7800W): The radio packets comprise of a PHY preamble, PHY/frame header, and radio payload data. The PHY preamble and the PHY/frame header are sent in the clear. The TFS validation implementation may define the method how to initiate the wireless exchange between a RF-7800W master and a RF-7800W slave across the management channel: providing network entry of a RF-7800W node for establishing the initial wireless link, node level verification of the identity of the claimed source of data, and internal authentication by using known information about the link; and ensuring a legitimate RF-7800W system is resistant to DoS or other attack scenarios from a rogue system, i.e. wireless replay protection, and anti-spoofing protection.

TFS Field Validation Method: The implementation of $P_N$, $B_0$ (nonce) fields combined with the ICV field validation effectively serves as the TFS frame level authentication mechanism. This is used to authenticate a valid unaltered frame transmission and may be used for all transmissions while in a TFS enabled mode. The TFS 4 check field validation method may be used to verify the authenticity of the RF-7800W radio frame, where PN=counter used for key expiration mechanism. The PN value determines when the encryption keys are changed, and when the encryption key index used in nonce is incremented.

Referring additionally to FIG. 16, the structure $B_0$ 70 of the nonce used by the receiver is illustrated, which is the same with the one used by the transmitter. The $P_N$ 81 received may be used to generate its nonce, and detect when the decryption key needs to be changed. The decryption key may be declared expired when the $P_N$ 81 received reaches the expiration value for that particular key, and when $P_N$ received in this frame is smaller than the $P_N$ received in previous frame. Upon any Field validation failure, the received data may be discarded.

Figure 17:
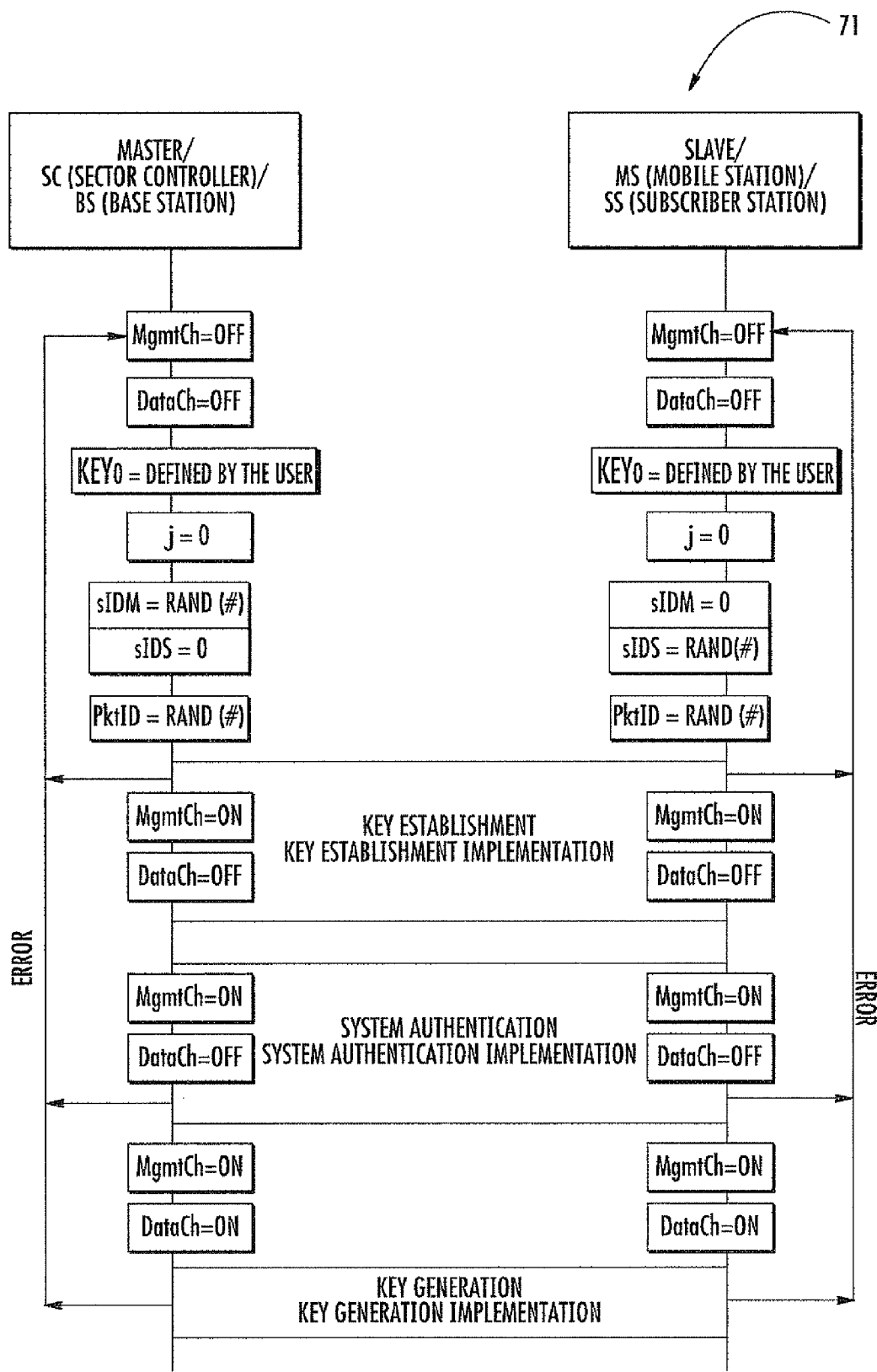
FIG. 17 is a schematic diagram of a message sequence for a network entry sequence of a wireless node using TFS validation in the wireless communications system of FIG. 1.

TFS Validation Sequence Diagram: Communications over the RF-7800W wireless channel may be encrypted from the very first transmission. These are fields specific to the RF-7800W that can be advantageous in the TFS method and lessen consumption of resources, memory space use, and latency. Each communication may be initiated by generating two random numbers: a master may generate a session ID master (sIDM), and a slave may generate a session ID Slave (sIDS). A global session ID (sID) may be created by concatenating the session IDs of master and slave, both units may participate in the generation of the global session ID. The sID may be present in all the packets exchanged between master and slave during a management session, prior to opening a data channel. All the packets that do not have the right sID may be discarded. If a link breaks, the session may be closed. A new sID may be generated at the start of every new session. Referring now to FIG. 17, a diagram 71 illustrates a message sequence for TFS validation.

The TFS validation is a method implemented and initiated upon receiving each and every frame from a node. FIG. 17 illustrates that the TFS implementation can be ported and scaled within a larger scope than this diagram 71 describes, and that it can fill the security holes that leave a wireless system vulnerable, i.e. before reaching system authentication and so on. In addition, this diagram 71 also shows that the TFS validation implementation can interact with standard implementations of NIST, FIPS, and so on, while plugging the security hole.

Key Establishment implementation: This section outlines how a master and slave may create a unique key used for all data and management transmissions after full link authentication. a.) The key establishment mechanism may be based on NIST Special Publication 800-56A, March 2007, Recommendation for Pair-Wise Key Establishment Schemes Using Discrete Logarithm Cryptography. b.) Key generation may be based on a pre-shared secret. c.) All messages exchanged during this process may be encrypted using the AES algorithm, if the encryption is activated. d.) At the conclusion of this process, a RF-7800W may have the assurance that only systems that participated in the key establishment and exchange process know the shared secret key. e.) A RF-7800W system using a set of domain parameters may have assurance of domain parameter validity prior to using them. f.) Domain parameters may be managed so that the correct correspondence between a given key pair and its set of domain parameters is maintained for all parties that use the key pair.

g.) The sizes of the parameters may be chosen based on the NIST SP 800-56A recommendations, domain parameters for Diffie-Hellman. h.) Discrete Logarithm Cryptography (DLC), which includes Finite Field Cryptography (FFC), may require that the public and private key pairs be generated with respect to a particular set of domain parameters. i.) DLC, FFC domain parameters may be generated using a method specified in FIPS 186-3 for FFC.

Figure 18:
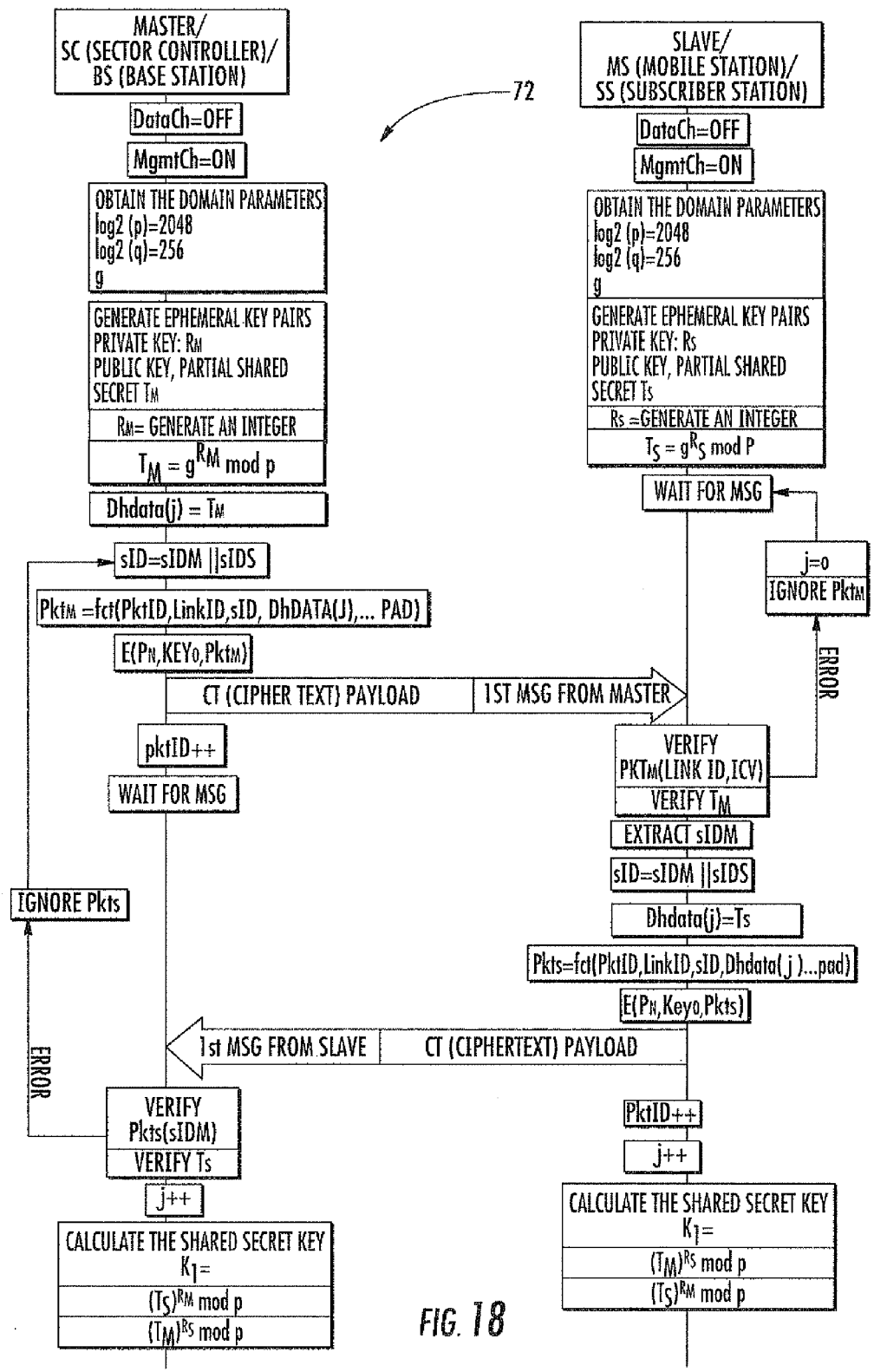
FIG. 18 is a schematic diagram of a message sequence-key establishment in the wireless communications system of FIG. 1.

Sequence Diagram Referring now to FIG. 18, a diagram 72 illustrates the message sequence diagram-key establishment. The wireless node can immediately estimate the validity of a frame using the TFS check field and the frame verification parameters. This verification may allow the wireless node to "instantly" reject the frame if needed, without any further processing. The wireless node can then accurately validate the frame by verifying the authentication value, which shares the TFS Check Field and the entire unique structure. The TFS Check Field is member of the unique structure, as described above. Therefore, the entire frame validation can be completed without having to decrypt the data payload or having to process the message and payload data.

Domain parameters for FFC schemes may be of the form (p, q, g {, SEED, pgenCounter}), where: p=is the (larger) prime field order, size of the public key; q=is the (smaller) prime (multiplicative) subgroup order, size of the private key; g=is the generator of the subgroup of order q; SEED=is an initialization value that is used during domain parameter generation; pgenCounter=is a value that may be output during domain parameter generation to provide assurance at a later time that the resulting domain parameters were generated arbitrarily; mod p=the reduction modulo p of an integer value; $R_M$, $R_S$=ephemeral private key (These are integers in the range [1, q−1]); TM, TS=ephemeral public key (These are integers in the range [2, p−2], representing elements in the finite field of size p); K1=is a shared secret that is used to derive secret keying material using a key derivation function; and E=AES Rinjdael Block Cipher.

The size of p (public key size) may be a multiple of 1024 bits. The initial key exchange may be implemented based on FFC and the Diffie-Hellman algorithm. Each party may have an authentic copy of the same set of domain parameters. Domain parameters may be generated using FFC schemes. Each party may have assurance of the validity of these domain parameters, and may have agreed upon an approved key derivation function. Moreover, each party may generate ephemeral key pairs with the same domain parameters. The two parties may exchange ephemeral public keys and then compute the shared secret. The secret keying material may be derived using the shared secret.

System Authentication implementation: The assurance that one RF-7800W unit exchanges the key with the desired RF-7800W unit may be accomplished by enforcing a mutual authentication process before data channel is open or new key exchanges can proceed. During system authentication, all messages exchanged through the management channel may be encrypted. The verification of the system legitimacy may be done over the secure management channel and is accomplished through the use of pre-assigned certificates, and system authentication protocol exchange.

At the conclusion of this phase, each system may be assured that it exchanged the shared secret key with the intended RF-7800W system and that secret key is known only by the two systems. The exchanged key, K, may be used as input in an approved key derivation function in order to obtain the keys needed to program the AES module. AES may be used to encrypt the data over the wireless channel. This method may be compatible with the method to derive a key encryption key (KEK) that may be used for securely exchanging the future AES data keys needed to reprogram the AES module.

Certificates: Each certificate may contain the following set of information: the unit for which it was generated (i.e. the MAC address); the entity who generated the certificate; the algorithms for which this certificate applies (i.e. RSA, DH, SSL); the hash function used to generate the signature attached to certificate and its strength (in number of bits); the public key attached to certificate; and a signature.

Authentication Protocol: The authentication protocol may be based on public key cryptography. The authentication protocol may be implemented based on the mutual authentication protocol described in FIPS PUB 196, entity authentication using public key cryptography. This standard specifies two challenge-response protocols by which entities may authenticate their identities to one another.

The authentication protocol may be dependent on: the verification of the claimant's binding with its public/private key pair; the verification of the claimant's digital signature on the random number challenge; and the generation of random number challenges, which have a low probability of being repeated.

The use of random number challenges prevents an intruder from copying an authentication token sign by another unit and replaying it successfully at a later time. Moreover, the use of a private key to generate digital signatures for authentication also helps. Each RF-7800W maintains its private key secure and under its sole control, and a new number may be generated for each authentication exchange. A system attempting to authenticate may use a private key to digitally sign a random number challenge issued by the verifying system. The random number is a time variant parameter and unique to the authentication exchange.

A RF-7800W system may be successfully authenticated only if a RF-7800W unit can successfully verify the signed response using the public key provided by the requesting device. The authentication exchange may be terminated if any of the verification processing steps fails, i.e.: authentication message; initiator's certificate or certificate chain; correct value of initiator's signature; and the correct value of the RS and RM.

Sequence Diagram for System Authentication—Definitions: These authentication protocol definitions are based on FIPS PUB 196, which are taken from terminology defined in ISO/IEC 9798-1:1991, General Model (ISO/IEC 9798-1) which describes the general model for the ISO/IEC 9798 series of entity authentication standards. Other definitions are from FIPS PUB 140-1, Section 2.1.

The definitions include: Entity=RF-7800W Master or Slave, each entity acts as both a claimant and a verifier; master=RF-7800W; initiator slave=RF-7800W responder; authentication token=authentication information conveyed during an authentication exchange; claimant=an entity or its representative whose identity can be authenticated for the purposes of authentication; and FIPS approved security method=a security method (e.g., cryptographic algorithm, cryptographic key generation algorithm or key distribution technique, random number generator, authentication technique, or evaluation criteria) that is either a) specified in a FIPS, or b) adopted in a FIPS and specified either in an appendix to the FIPS or in a document referenced by the FIPS.

The definitions further include a private key=a cryptographic key used with a public key cryptographic algorithm, which is uniquely associated with an entity, and not made public, i.e. it is used to generate a digital signature, and this key is mathematically linked with a corresponding public key; and a public key=a cryptographic key used with a public key cryptographic algorithm, uniquely associated with an entity, and which may be made public, i.e. it is used to verify a digital signature, and this key is mathematically linked with a corresponding private key.

Notations: These authentication protocol notations are based on FIPS PUB 196 which are taken from the terminology defined in ISO/IEC 9798-1:1991, General Model (ISO/IEC 9798-1), which describes the general model for the ISO/IEC 9798 series of entity authentication standards. Notation describing parts of the authentication exchanges is based on ISO/IEC 9798-3 notation.

Figure 19:
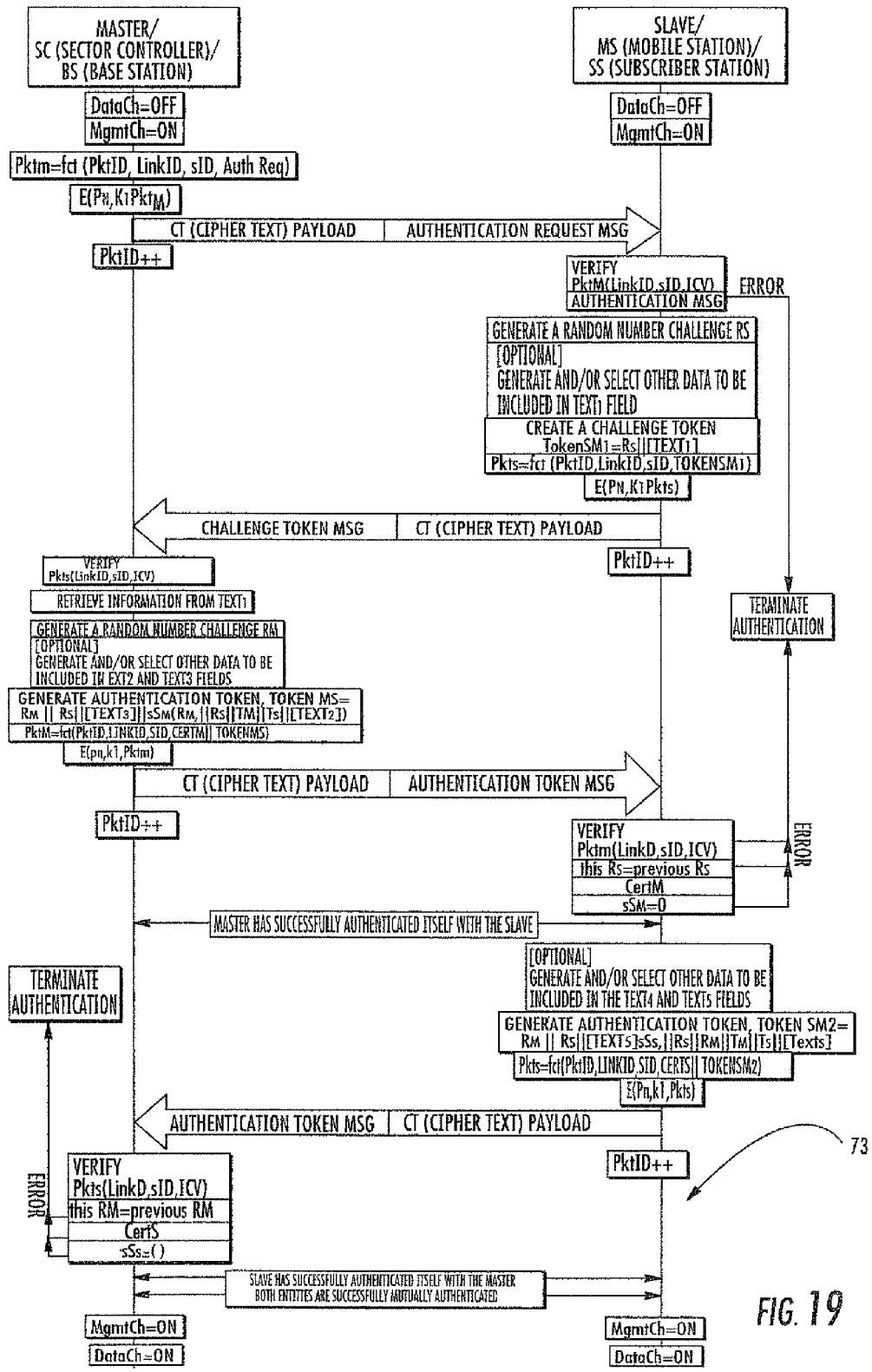
FIG. 19 is a schematic diagram of a message sequence for an authentication protocol in the wireless communications system of FIG. 1.

Referring now to FIG. 19, a flowchart 73 illustrates a message sequence for an authentication protocol. This flowchart 73 describes a "System Authentication" while using the TFS method to validate each frame received, first at the slave and second at the master. At the same time, the TFS method plugs the security holes and is fully compatible with the NIST/FIPS based "System Authentication" method described fully in this diagram.

The notations include: $_sS_M(Z)$—the digital signature of data Z using the private key SX (digital signature is not a forgeable transformation of data that allows the proof of the source (with nonrepudiation) and the verification of the integrity of that data); Z=is referred to as "signed data"; $_sS_M$=private key associated with the master, intended for the slave, used in generating a digital signature (It is a cryptographic key used with a public key cryptographic algorithm, which is uniquely associated with an entity, and not made public; this key is mathematically linked with a corresponding public key); CertM=certificate or chain of certificates of the master, that binds the master with a public-private key pair; $Text_N$=data of unspecified format and length that may be included in the token; $Text_{N-1}$=subset of $Text_N$; $TokenSM_i$=the i-th token sent from Master to Slave; RM, RS=a random number issued by an entity Master, Slave; and $T_M$, $T_S$=ephemeral public key, represent the partial shared secrets exchanged in the Diffie-Hellman key exchange protocol.

Data Key Generation Implementation: The data key may be regenerated based on a counter value (PN). This ensures that the data key is regularly changed for added security. The value at which the counter causes a data key regeneration may vary randomly to increase security. Subsequent encryption keys may be exchanged after the secure channel has been established and the system authentication is completed. The keys used to encrypt the management and data channels are calculated in different ways but both may be generated using NIST FIPS approved algorithms.

Data Rate Smoothing implementation: To reduce the ability to monitor and determine events based on traffic flow, the RF-7800W may implement a data rate smoothing mechanism. The result may be a constant flow of wireless packets between RF-7800W master and slave. This is designed to: smooth out the wireless data rate through concatenation of multiple user data frames into a wireless frame on both RF-7800Ws, master and slave systems, and insert variable size dummy data when insufficient amount of user data is present or during periods of inactivity.

Automatic variable size dummy data stuffing mechanism may be used to maintain a minimum and variable level of data transmission over the wireless channel regardless of the amount of actual user data traffic. All wireless frames, user data or dummy data, may be protected by the AES-256 encryption using the data key established during initial authentication or subsequent key regeneration. Both the amount of data and the sizes of the packets transmitted over the air may be concealed. This inhibits the ability of correlating the amount of data traffic across the wireless link with the occurrence of an event.

Figure 20:
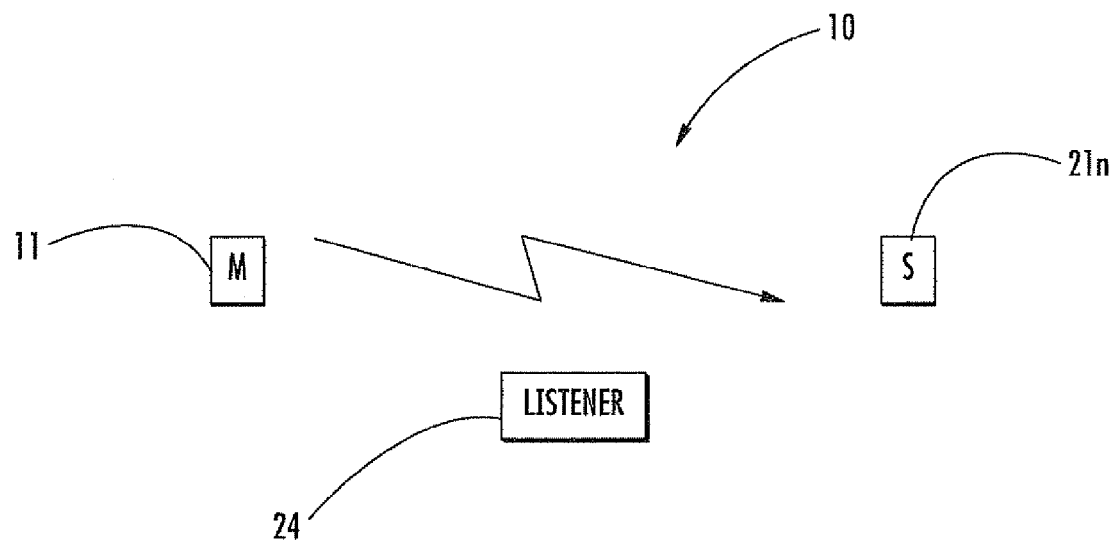
FIG. 20 is a schematic diagram of a passive listener threat scenario in the wireless communications system of FIG. 1.

Threat Scenarios-Passive Listener: Referring now to FIG. 20 and again to FIG. 1, a typical passive listener threat scenario is schematically illustrated. Two RF-7800W systems, one master wireless communications device 11, one slave wireless communications device 21n, attempt to establish management and data communication channels with one to the other. An intruder listener, i.e. rogue/infiltrator wireless communications device 24, may listen to their communication. The protocol uses random numbers generated at the time when the algorithm starts. The numbers are different for each key exchange, and the messages exchanged by the two units are $T_M$, $T_S$. The rogue/infiltrator wireless communications device 24 might know $T_M$, $T_S$, g and p. Nonetheless, the rogue/infiltrator wireless communications device 24 doesn't know the two ephemeral private keys, random numbers, $R_M$ and $R_S$, used to generate the ephemeral public keys, partial information $T_M$, $T_S$. The problem of finding $R_M$ and $R_S$ is known as the discrete logarithm and has no readily available method to solve it. The rogue/infiltrator wireless communications device 24 may have no other method to find the shared secret/key exchanged between units M and S.

Figure 21:
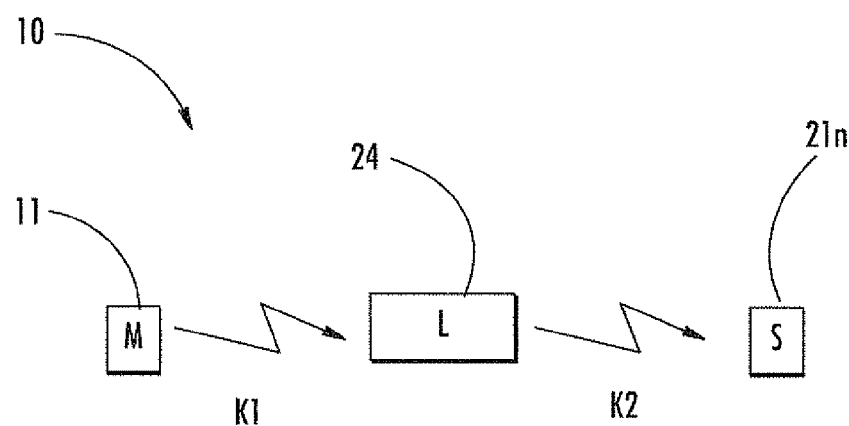
FIG. 21 is a schematic diagram of a man-in-the-middle threat scenario in the wireless communications system of FIG. 1.

Man-In-The-Middle: Referring now to FIG. 21 and again to FIG. 1, a typical Man-In-The-Middle threat scenario is schematically illustrated. Two RF-7800W systems, one master wireless communications device 11, one slave wireless communications device 21n, attempt to establish management and data communication channels with one to the other. An intruder, i.e. rogue/infiltrator wireless communications device 24, placed between them, actively participates in the exchange process. During key establishment, the rogue/infiltrator wireless communications device 24 may execute a Diffie-Hellman procedure with the master wireless communications device 11, and another one with the slave wireless communications device 21n.

After Diffie-Hellman procedure, there may be two ephemeral public keys exchanged, one between wireless communications devices 11, 24, the other between 21n, 24 (K2). The master and slave wireless communications device 11, 21n may not be able to detect this based only on the Diffie-Hellman. In this case, the rogue/infiltrator wireless communications device 24 may be able to decode every message from the master wireless communications device 11 and re-encode it back for the slave wireless communications device 21n. The same is true for all the messages from the slave wireless communications device 21n to the master wireless communications device 11.

During system authentication, if the rogue/infiltrator wireless communications device 24 tries to forward the messages between the master wireless communications device 11 and the slave wireless communications device 21n, the authentication may fail due to failure of the signature verification. The slave wireless communications device 21n uses K2 to generate/verify the signature, and the master wireless communications device 11 uses K1 to generate/verify the signature. The authentication is based on a random number challenge, and certificates and the ephemeral public keys exchanged during previous phase.

Replay Attack: Two RF-7800W systems, one master wireless communications device 11, one slave wireless communications device 21n, attempt to establish management and data communication channels with one to the other. The rogue/infiltrator wireless communications device 24 first listens and records the messages from one RE-7800W unit. The rogue/infiltrator wireless communications device 24 then tries to play back the recorded message to the other RF-7800W unit at later time.

For the receiving unit to open its data channels, the system authentication needs to be established first. Due to the use of entropy based RNG generation: the replayed message cannot be used to negotiate the first key exchange, and neither can the certification verification be successful. Assuming system level authentication is somehow by-passed, the receiving unit of the replayed messages may still able to detect this attack based on data frame authentication failures using the ICV validation mechanism. In this case, the receiving unit may discard all received messages.

Many modifications and other embodiments of the invention may come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A wireless communications system comprising:
a plurality of wireless communications devices with each comprising a wireless transceiver and a processor coupled thereto for transmitting and receiving communications and using a challenge-response authentication protocol;
said plurality of wireless communications devices comprising a master wireless communications device and at least one slave wireless communications device;
said master wireless communications device transmitting a polling message including an unencrypted portion and an initial encrypted challenge portion;
said at least one slave wireless communications device transmitting a polling reply message including an unencrypted portion and an initial encrypted response portion based upon receiving the polling message from said master wireless communications device;
said master wireless communications device filtering out the polling reply message from among a plurality of polling reply messages including spoof polling reply messages;
said master wireless communications device upon receiving the polling reply message thereafter transmitting packets to said at least one slave wireless communications device with each packet comprising a respective different subsequent encrypted challenge portion.

2. The wireless communications system according to claim 1 wherein said at least one slave wireless communications device transmits return packets to said master wireless communications device with each return packet comprising a respective different subsequent encrypted response portion.

3. The wireless communications system according to claim 1 wherein each of said processors performs bit stuffing on the communications to satisfy a data throughput threshold.

4. The wireless communications system according to claim 3 wherein each of said processors performs bit stuffing such that the communications appears as synchronous traffic.

5. The wireless communications system according to claim 1 wherein each of said processors arranges the communications as a plurality of packets with each packet comprising a predetermined number of bits.

6. The wireless communications system according to claim 5 wherein each of said processors breaks down packets of a first number of bits being greater than the predetermined number of bits into a plurality of packets of the predetermined number of bits.

7. The wireless communications system according to claim 5 wherein each of said processors assembles packets of a second number of bits being less than the predetermined number of bits into at least one packet of the predetermined number of bits.

8. The wireless communications system according to claim 1 wherein said processor of said master wireless communications device arranges messages as a plurality of packets with each packet comprising an unencrypted header, at least one of the initial encrypted challenge portion and a different subsequent encrypted challenge portion, and an encrypted payload portion.

9. The wireless communications system according to claim 8 wherein each packet defines a frame structure; and wherein at least one of the initial encrypted challenge portion and the different subsequent encrypted challenge portion is arranged between the unencrypted header and the encrypted payload portion.

10. The wireless communications system according to claim 1 wherein said processor of said at least one slave wireless communications device arranges messages as a plurality of packets with each packet comprising an unencrypted header, at least one of the initial encrypted response portion and a different subsequent encrypted response portion, and an encrypted payload portion.

11. The wireless communications system according to claim 1 wherein each of said wireless transceivers comprises an IEEE 802.16 WiMAX transceiver.

12. A master wireless communications device in a wireless communications system including a plurality of wireless communications devices, at least one thereof being a slave wireless communications device, the wireless communications devices transmitting and receiving communications and using a challenge-response authentication protocol, the master wireless communications device comprising:
a wireless transceiver; and
a processor coupled to said wireless transceiver for
transmitting a polling message including an unencrypted portion and an initial encrypted challenge portion,
receiving a polling reply message from the at least one slave wireless communications device including an unencrypted portion and an initial encrypted response portion based upon receiving the polling message, and
thereafter transmitting packets to the at least one slave wireless communications device with each packet comprising a respective different subsequent encrypted challenge portion, and receiving return packets from the at least one slave wireless communications device with each return packet comprising a respective different subsequent encrypted response portion.

13. The master wireless communications device according to claim 12 wherein said processor performs bit stuffing on the communications to satisfy a data throughput threshold.

14. The master wireless communications device according to claim 12 wherein said processor arranges the communications as a plurality of packets with each packet comprising a predetermined number of bits.

15. The master wireless communications device according to claim 14 wherein said processor breaks down packets of a first number of bits being greater than the predetermined number of bits into a plurality of packets of the predetermined number of bits.

16. The master wireless communications device according to claim 14 wherein said processor assembles packets of a second number of bits being less than the predetermined number of bits into at least one packet of the predetermined number of bits.

17. A slave wireless communications device in a wireless communications system including a plurality of wireless communications devices, at least one thereof being a master wireless communications device, the wireless communications devices transmitting and receiving communications and using a challenge-response authentication protocol, the slave wireless communications device comprising:
a wireless transceiver; and
a processor coupled to said wireless transceiver for
receiving a polling message from the at least one master wireless communications device including an unencrypted portion and an initial encrypted challenge portion,
transmitting a polling reply message including an unencrypted portion and an initial encrypted response portion based upon receiving the polling message, and
thereafter receiving packets from the at least one master wireless communications device with each packet comprising a respective different subsequent encrypted challenge portion, and transmitting return packets to the at least one master wireless communications device with each return packet comprising a respective different subsequent encrypted response portion.

18. The slave wireless communications device according to claim 17 wherein said processor performs bit stuffing on the communications to satisfy a data throughput threshold.

19. The slave wireless communications device according to claim 17 wherein said processor arranges the communications as a plurality of packets with each packet comprising a predetermined number of bits.

20. The slave wireless communications device according to claim 19 wherein said processor breaks down packets of a first number of bits being greater than the predetermined number of bits into a plurality of packets of the predetermined number of bits; and wherein said processor assembles packets of a second number of bits being less than the predetermined number of bits into at least one packet of the predetermined number of bits.

21. A method of operating a wireless communications system comprising a plurality of wireless communications devices for transmitting and receiving communications and using a challenge-response authentication protocol, the wireless communications devices comprising a master wireless communications device and at least one slave wireless communications device, the method comprising:
- transmitting from the master wireless communications device a polling message including an unencrypted portion and an initial encrypted challenge portion;
- transmitting from the at least one slave wireless communications device a polling reply message including an unencrypted portion and an initial encrypted response portion based upon receiving the polling message from the master wireless communications device;
- the master wireless communications device filtering out the polling reply message from among a plurality of polling reply messages including spoof polling reply messages; and
- upon the master wireless communications device receiving the polling reply message, thereafter transmitting packets to the at least one slave wireless communications device with each packet comprising a respective different subsequent encrypted challenge portion.

22. The method according to claim 21 further comprising transmitting from the at least one slave wireless communications device return packets to the master wireless communications device with each return packet comprising a respective different subsequent encrypted response portion.

23. The method according to claim 21 further comprising performing bit stuffing on the communications to satisfy a data throughput threshold.

24. The method according to claim 21 further comprising arranging the communications as a plurality of packets with each packet comprising a predetermined number of bits.

25. The method according to claim 24 further comprising breaking down packets of a first number of bits being greater than the predetermined number of bits into a plurality of packets of the predetermined number of bits, and assembling packets of a second number of bits being less than the predetermined number of bits into at least one packet of the predetermined number of bits.

26. A wireless communications system comprising:
- a plurality of wireless communications devices with each comprising a wireless transceiver and a processor coupled thereto for transmitting and receiving communications and using a challenge-response authentication protocol;
- said plurality of wireless communications devices comprising a master wireless communications device and at least one slave wireless communications device;
- said master wireless communications device transmitting a polling message including an unencrypted portion and an initial encrypted challenge portion;
- said at least one slave wireless communications device transmitting a polling reply message including an unencrypted portion and an initial encrypted response portion based upon receiving the polling message from said master wireless communications device;
- said master wireless communications device upon receiving the polling reply message thereafter transmitting packets to said at least one slave wireless communications device with each packet comprising a respective different subsequent encrypted challenge portion;
- said at least one slave wireless communications device transmitting return packets to said master wireless communications device with each return packet comprising a respective different subsequent encrypted response portion.

27. The wireless communications system according to claim 26 wherein each of said processors performs bit stuffing on the communications to satisfy a data throughput threshold.

28. The wireless communications system according to claim 27 wherein each of said processors performs bit stuffing such that the communications appears as synchronous traffic.

29. A method of operating a wireless communications system comprising a plurality of wireless communications devices for transmitting and receiving communications and using a challenge-response authentication protocol, the wireless communications devices comprising a master wireless communications device and at least one slave wireless communications device, the method comprising:
- transmitting from the master wireless communications device a polling message including an unencrypted portion and an initial encrypted challenge portion;
- transmitting from the at least one slave wireless communications device a polling reply message including an unencrypted portion and an initial encrypted response portion based upon receiving the polling message from the master wireless communications device; and
- upon the master wireless communications device receiving the polling reply message, thereafter transmitting packets to the at least one slave wireless communications device with each packet comprising a respective different subsequent encrypted challenge portion, and transmitting from the at least one slave wireless communications device return packets to the master wireless communications device with each return packet comprising a respective different subsequent encrypted response portion.

30. The method according to claim 29 further comprising performing bit stuffing on the communications to satisfy a data throughput threshold.

31. The method according to claim 29 further comprising arranging the communications as a plurality of packets with each packet comprising a predetermined number of bits.

* * * * *